United States Patent
Sun et al.

(10) Patent No.: US 11,812,427 B2
(45) Date of Patent: Nov. 7, 2023

(54) METHODS AND DEVICES FOR CONTROLLED UPLINK SCHEDULING

(71) Applicant: Telefonaktiebolaget LM Ericsson (publ), Stockholm (SE)

(72) Inventors: Ying Sun, Sundbyberg (SE); Fredrik Huss, Sundbyberg (SE); Xuejun Yang, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 435 days.

(21) Appl. No.: 17/052,174

(22) PCT Filed: May 30, 2018

(86) PCT No.: PCT/SE2018/050548
§ 371 (c)(1),
(2) Date: Oct. 30, 2020

(87) PCT Pub. No.: WO2019/231366
PCT Pub. Date: Dec. 5, 2019

(65) Prior Publication Data
US 2021/0112575 A1    Apr. 15, 2021

(51) Int. Cl.
*H04W 4/00*        (2018.01)
*H04W 72/1268*     (2023.01)
(Continued)

(52) U.S. Cl.
CPC ... *H04W 72/1268* (2013.01); *H04W 28/0278* (2013.01); *H04W 72/52* (2023.01); *H04W 76/11* (2018.02)

(58) Field of Classification Search
CPC ......... H04W 72/1268; H04W 28/0278; H04W 72/52; H04W 76/11
(Continued)

(56) References Cited

U.S. PATENT DOCUMENTS 10,033,550 B2 *   7/2018   Abdoli ................. H04L 5/0048
2010/0165932 A1   7/2010   Wan et al.
(Continued)

OTHER PUBLICATIONS

International Search Report and Written Opinion for International Application No. PCT/SE2018/050548, dated Jan. 29, 2019, 12 pages.
(Continued)

*Primary Examiner* — Chuong T Ho
(74) *Attorney, Agent, or Firm* — Nicholson De Vos Webster & Elliott LLP

(57) ABSTRACT

A method for operating a network node in a wireless communication network. The method comprises detecting signals transmitted from wireless communication devices scheduled for uplink transmissions. The method also comprises selecting a subset of the detected signals for decoding. The method also comprises decoding the selected subset and initiating a rescheduling of the wireless communication devices that transmitted the detected signals that were not selected. Also disclosed is a method performed by a network device in a wireless communication network. The method comprises scheduling wireless communication devices for uplink transmissions. The method also comprises obtaining information enabling an identification of a subset of wireless communication devices that transmitted signals using said scheduling but whose transmitted signals were not selected for decoding and rescheduling said subset of wireless communication devices for uplink transmissions. Corresponding network nodes and network devices and relate computer programs are also disclosed.

20 Claims, 20 Drawing Sheets

(51) Int. Cl.
  *H04W 76/11* (2018.01)
  *H04W 28/02* (2009.01)
  *H04W 72/52* (2023.01)
(58) Field of Classification Search
  USPC .................................. 370/329, 330, 328
  See application file for complete search history.

(56) References Cited

U.S. PATENT DOCUMENTS

2018/0139774 A1\* 5/2018 Ma ................ H04L 1/1893
2018/0199359 A1\* 7/2018 Cao ............... H04W 72/1268
2020/0280362 A1\* 9/2020 Garcia ............ H04B 7/0617

OTHER PUBLICATIONS

Communication under Rule 71(3) EPC for EP Application No. 18731916.5, Feb. 27, 2023, 197 pages.

\* cited by examiner

METHODS AND DEVICES FOR CONTROLLED UPLINK SCHEDULING

CROSS-REFERENCE TO RELATED APPLICATIONS

This application is a National stage of International Application No. PCT/SE2018/050548, filed May 30, 2018, which is hereby incorporated by reference.

TECHNICAL FIELD

The proposed technology generally relates to a method for operating a network node in a wireless communication network and a method performed by a network device in a wireless communication network. The proposed technology also relates to corresponding devices and computer programs.

BACKGROUND

In cellular wireless systems, such as Long Term Evolution (LTE) and New Radio (NR) standards in 3GPP, resources for UL transmissions are normally scheduled by the network node such as an eNB or gNB. The scheduling can be performed in a dynamical fashion, that is, the eNB may schedule uplink transmissions, UL transmissions, per transmission occasion. The transmission occasion can be a transmission time interval, TTI, or multiple TTIs, i.e., TTI bundling. The scheduling may alternatively be done using a framework of semi persistent scheduling, SPS, so that multiple periodic transmission occasions are granted at once but with a predefined pattern. Typically, configuration of SPS includes periodicity of the grant, allocation in time and frequency and modulation and coding scheme, MCS, in subsequent SPS occasions.

SPS was enhanced in LTE rel-14 to support latency reduction of UL data transmissions. Compared to UL dynamic scheduling, SPS can access the UL transmission resources more quickly, since it removes the need to send scheduling request to the UE and responding by sending UL dynamic grant.

To further reduce latency, the periodicity may be reduced to the minimum value, i.e., one TTI in LTE. In pre Rel-14, if the buffer is empty, then UE needs to send a padding on the allocated SPS resources. It is more likely that the UE might have empty data with such a low periodicity, and sending padding at every TTI introduces many un-necessary interferences. Consequently, the option of skipping UL data transmissions when the buffer is empty is introduced. However, the configured resources are still reserved for the UE, and that might lead to inefficient resource utilization.

In New Radio, NR, the principle of allocating periodic UL transmission resources in SPS is adopted. Some further features are added to support low latency and high reliability requirement.

Two types of UL transmission without grant have been specified. In type 1 UL data transmission without grant, resource configuration is only based on RRC (re)configuration without any L1 signaling. Type 2 UL data transmission without grant is quite similar to LTE SPS, which is based on both RRC configuration and L1 signaling to activation/deactivation of the UL resources. Since NR is still in progress, in what follows, we will use the term UL transmission without grant or uplink grant free, UGF, transmissions where both can refer to either of the type 1 or type 2 schemes as explained above. Also UL configured grant, or semi-persistent scheduling, are used either for the same concept or similar concept where the proposed technology apply.

FIG. 1 illustrates the part of the receiver chain in network node that is relevant for the proposed technology. FIG. 1 illustrates how a scheduler schedules a list of devices for uplink transmissions. This processing is normally performed in Medium Access layer 2, MAC-layer 2 referred to below as L2. The list of devices, e.g., User Equipment, UEs, that are requested to be scheduled contains both Uplink Grant Free, UGF, configured UEs and UEs that are requested to be scheduled dynamically. The scheduler in L2 selects a list of UEs that are scheduled/activated so that the maximal processing capability of the network node, e.g, an eNB or gNB, is maintained based on different scheduling strategy, such as round robin, proportional fair extra, etc. The scheduled UEs will be sent to the receiver chain in MAC-layer 1, referred to below as L1, in order to prepare the receptions for all UEs at a later time. The L1 processing at the eNB/gNB receiver will at least perform the processes of channel estimation, demodulation and decoding for all the scheduled UEs based on the scheduling decisions.

As shown in FIG. 1 the number of devices to be received is decided by the L2 scheduler and the number of devices that can be scheduled will be limited by the processing capability of the network node. The latency improvement in system level will thus be limited by the processing capacity of the network node.

The aim of the proposed technology is to provide mechanism that enables a more efficient use of the finite processing capabilities of the network node. The proposed technology aims in particular to provide mechanisms that reduces the workload for L1 processing.

SUMMARY

It is an object of the proposed technology to provide mechanisms that enables a more economic use of the processing resources that are available for receiving and decoding of signals.

It is a particular object to provide a method for operating a network node that enables a more economic use of processing resources.

It is an additional object to provide a corresponding network node.

It is another additional object to provide a corresponding computer program and computer program product carrying the computer program.

It is another particular object to provide a method performed by a network device that enables a more economic use of processing resources.

It is an additional object to provide a corresponding network device.

It is another additional object to provide a corresponding computer program and computer program product carrying the computer program.

These and other objects are met by embodiments of the proposed technology.

According to a first aspect, there is provided a method for operating a network node in a wireless communication network, the method comprises detecting signals transmitted from wireless communication devices scheduled for uplink transmissions. The method also comprises selecting a subset of the detected signals for decoding. The method also comprises decoding the selected subset. The method also comprises initiating a rescheduling of the wireless communication devices that transmitted the detected signals that were not selected.

According to a second aspect of the proposed technology there is provided a network node in a wireless communication network. The network node is configured to detect signals transmitted from wireless communication devices scheduled for uplink transmissions. The network node is also configured to select a subset of the detected signals for decoding. The network node is also configured to decode the selected subset. The network node is also configured to initiate a rescheduling of the wireless communication devices that transmitted the detected signals that were not selected.

According to a third aspect of the proposed technology there is provided a method performed by a network device in a wireless communication network. The method comprises scheduling wireless communication devices for uplink transmissions. The method also comprises obtaining information enabling an identification of a subset of wireless communication devices that transmitted signals using the scheduling but whose transmitted signals were not selected for decoding. The method also comprises rescheduling the subset of wireless communication devices for uplink transmissions.

According to a fourth aspect of the proposed technology there is provided a network device in a wireless communication network. The network device is configured to schedule wireless communication devices for uplink transmissions. The network device is also configured to obtain information enabling an identification of a subset of wireless communication devices that transmitted signals using the scheduling but whose transmitted signals were not selected for decoding. The network device is also configured to reschedule the wireless communication devices for uplink transmissions.

According to a fifth aspect of the proposed technology there is provided a computer program for operating, when executed, a network node. The computer program comprises instructions, which when executed by at least one processor, cause the at least one processor to:
  read information relating to detected signals transmitted from wireless communication devices scheduled for uplink transmissions
  select a subset of the detected signals for decoding
  output information identifying the selected subset to enable a decoding of the selected subset; and
  output information identifying the signals that were not selected to enable an initiation of a rescheduling of the wireless communication devices that transmitted the signals that were not selected.

According to a sixth aspect of the proposed technology there is provided a computer program for operating, when executed, a network device in a wireless communication network. The computer program comprises instructions, which when executed by at least one processor, cause the at least one processor to:
  schedule wireless communication devices for uplink transmissions
  read information enabling an identification of a subset of the wireless communication devices that transmitted signals using the scheduling but whose transmitted signals were not selected for decoding
  identifying the subset of wireless communication devices
  reschedule the identified subset of wireless communication devices for uplink transmissions.

According to a seventh aspect of the proposed technology there is provided a computer-program product comprising a computer-readable medium having stored thereon a computer program as described by the fifth or sixth aspect.

Embodiments of the proposed technology enables an economic use of the processing resources that are available for receiving and decoding messages. The proposed technology provides mechanisms whereby potentially all wireless communication devices may be configured to use uplink grant free transmissions. The proposed technology may therefore be used to improve the overall data transmission latency since there is no need to go through a scheduling request loop if the wireless communication devices can be configured with uplink grant free transmission functionalities.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Figure 1:
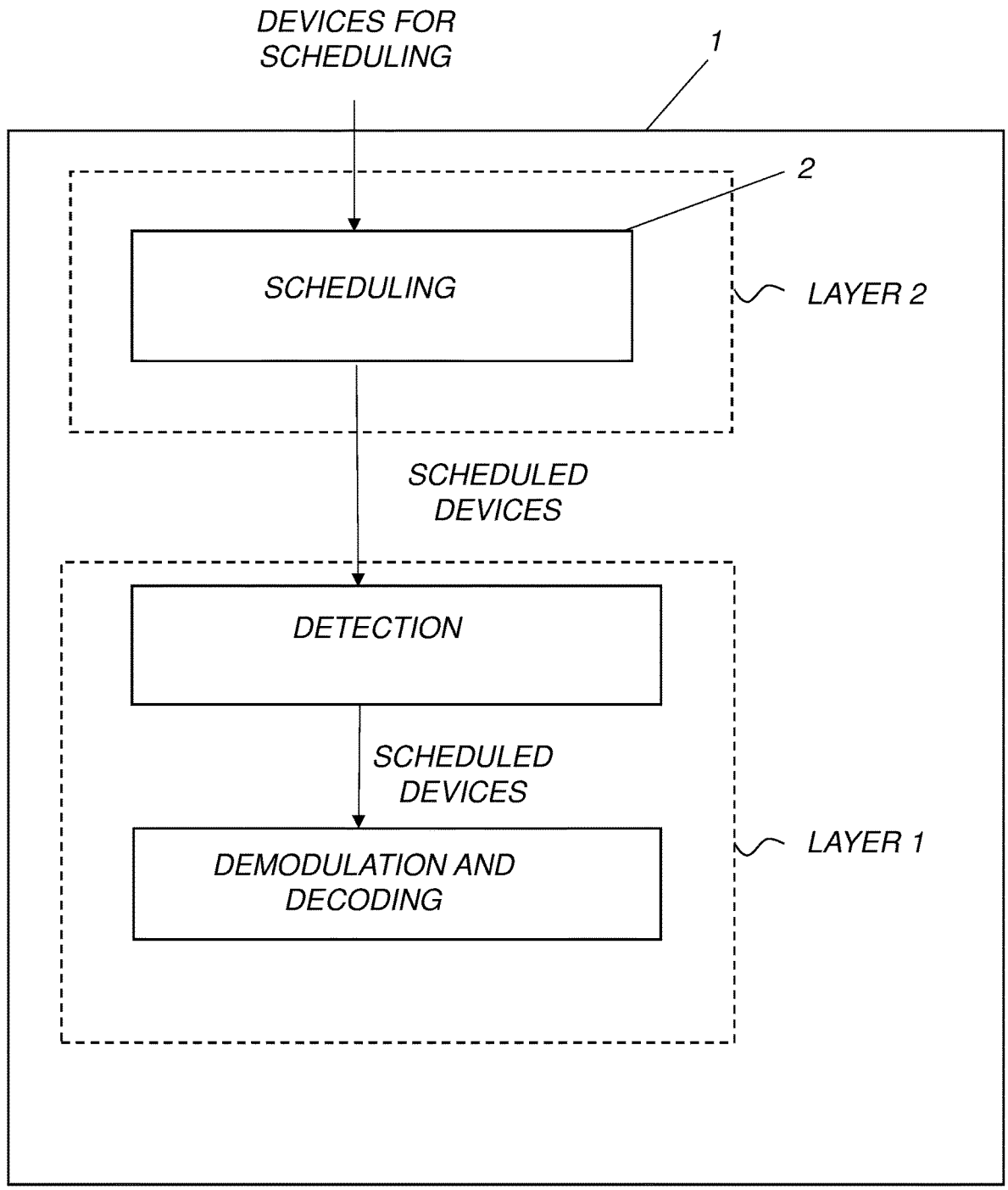
FIG. 1 is a schematic illustration of the functionalities in layers 1 and 2 during the scheduling of uplink transmissions and reception of signals transmitted on the uplink.

For a better understanding of the proposed technology, it may be useful to begin with a brief system overview and/or analysis of the technical problem. To this end reference is made to FIG. 1. FIG. 1 provides a schematic illustration of the workings of a radio network node during scheduling and reception of signals transmitted from wireless communication devices. At first a number of wireless communication devices are scheduled to transmit on the uplink by a scheduling functionality, sometimes referred to as a scheduler, provided in Layer 2, L2. Based on the scheduled resources, e.g., time and frequency resources, all of the scheduled wireless communication devices transmits uplink signals that are detected and subsequently decoded. With decoded are, in the context of the present disclosure, intended all steps that reveals the actual content of a detected signal, e.g., the demodulation and decoding steps that are performed by a network node. The reception functionality, sometimes referred to as the receiver chain, that comprises e.g., detection, demodulation and decoding of as signal is processed in the physical layer, i.e., in L1. The complete reception process is in itself rather demanding when it comes to the processing ability in L1. The demands put on the processing ability will moreover be even higher in scheduling scenarios where periodic uplink grants are used. That is, when wireless communication devices have been accorded the right to transmit on the uplink on periodically assigned resources. The wireless communication devices will then be forced to transmit at their assigned periodic resources even though they have no actual data to transmit. The consequence of this is that a lot of signals with padding will be transmitted. The demodulation and decoding of such padded signals will claim a fair share of the L1-processing resources. The aim of the proposed technology is to provide mechanisms that enables a more economic use of the finite L1-processing resources even in those cases where Uplink Grant Free transmissions, UGF transmissions, are used. It should be noted that in the context of the present disclosure UGF transmissions refer to all transmission that are based on scheduling procedures where a wireless communication device is provided transmission resources for uplink transmission without an explicit request for a grant. For example by being assigned a periodic grant upon a first request for grant.

In order to provide an improvement of the scheduling functionality in a network node the inventors have identified that the bottleneck of L1 processing in the receiver chain is demodulation and decoding while channel estimation is a rather cost efficient functionality. Based on this the inventors have realized that it is possible to split the L1 processing into two parts. A first part that comprises detecting signals transmitted with assigned scheduling resources and selecting a subset of them for decoding. The selection may in a particular example be at least partially based on a channel estimation on the detected signals. The channel estimation may be applied to all detected signals and in particular to those signals that were transmitted using UGF transmissions. The second part of the L1 processing concerns decoding of the detected signals. The second part is more processing intensive and the number of signals that can be processed is limited by the processing capacity network node. The proposed technology provides mechanism whereby only a subset of the detected signals that were transmitted from the wireless communication devices will be subjected to a decoding while the wireless communication devices that transmitted the signals that were not selected for subsequent demodulation and decoding will be subject for a rescheduling. One particular benefit obtained by this is that it will be possible to overschedule. That is, the fact that just part of the detected signals are selected for full L1-processing add the possibility of overscheduling at the scheduling functionality, e.g., overscheduling by the L2-scheduler. A bird's eye view of a particular example of the proposed technology is provided by FIG. 2.

Figure 2:
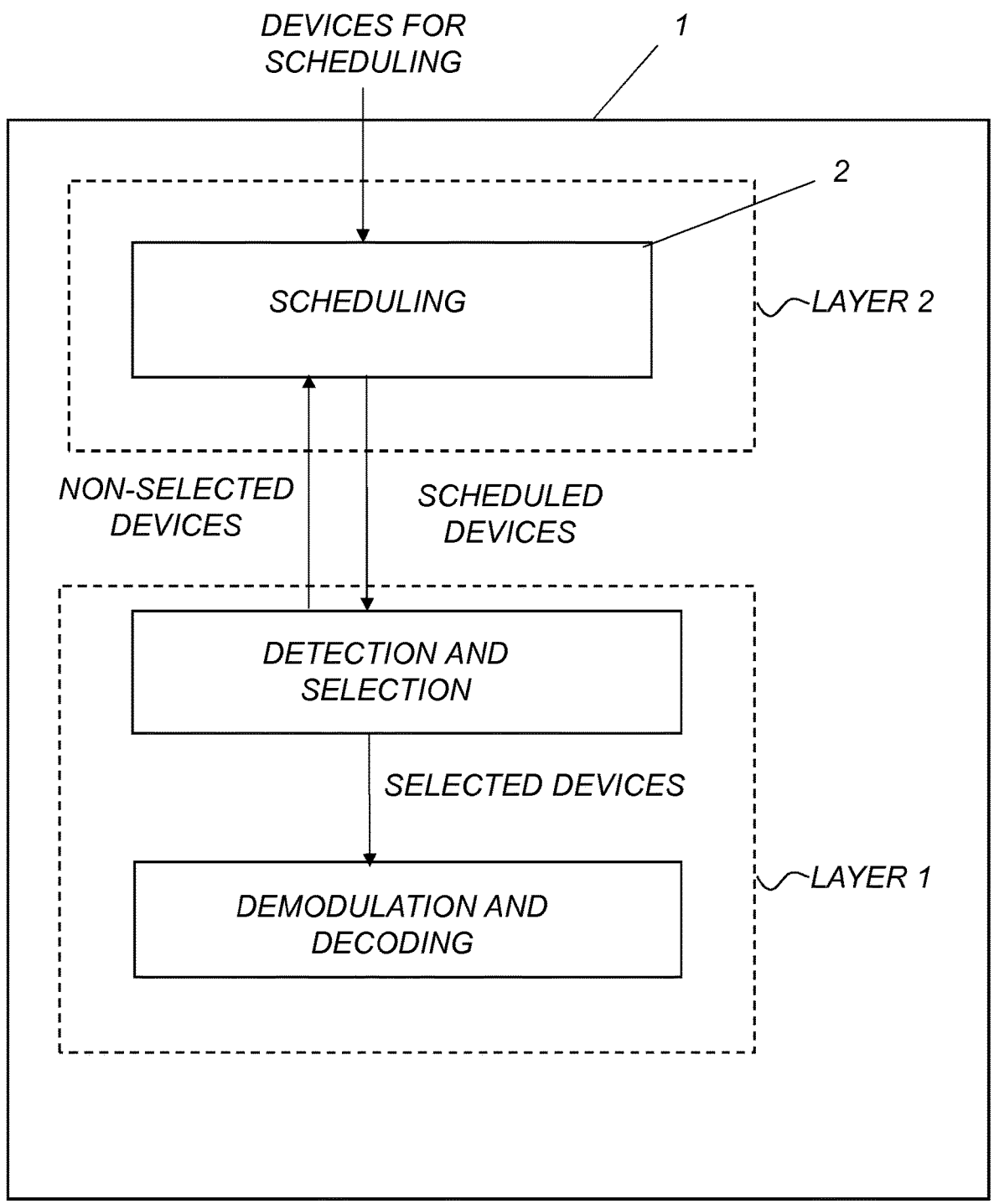
FIG. 2 is a schematic illustration of the functionalities in layers 1 and 2 during the scheduling of uplink transmissions and reception of signals transmitted on the uplink according to an exemplary embodiment of the propose technology.

In FIG. 2 it is illustrated how a network node may schedule a number of wireless communication devices for uplink transmissions, i.e., transmissions to the network node. At first a L2-functionality, i.e., a scheduler, is used to assign resources to a list or wireless communication devices. The scheduling strategy used to assign resources may vary between different wireless communication devices, that is, some of the devices may be scheduled using dynamical scheduling, e.g., based on a grant request transmitted by the device, while others may be scheduled to use UGF-transmissions, that is, scheduled to transmit uplink signals based on e.g., periodical resources.

Having assigned transmission resources to the wireless communication devices the network node proceeds and detects the signals that were transmitted according to the scheduled resources. At this stage of the process the network node selects a subset of the detected signals for decoding. The selection process may in a particular embodiment utilize channel estimations of the channels over which the different signals were transmitted. Based on the particular channel estimations the network node proceeds and select a particular subset of the detected signals for subsequent decoding. The selection strategy may for example be that only those signals that are associated with channels whose channel estimations are above a particular threshold are selected for decoding. The non-selected set of detected signals will not be decoded and the network node will instead initiate a new scheduling of the wireless communication devices responsible for transmitting the non-selected set of detected signals. This initiation may for example be performed by providing the scheduling functionality in L2 with information that enable it to identify those specific wireless communication devices that are to be scheduled anew, i.e., that are to be rescheduled. The procedure thus acts as a sort of sieve where signals of inferior quality are sorted out, i.e., not selected for decoding, and the wireless communication devices that transmitted them are rescheduled to transmit at a later transmission resource.

A particular advantage that is achieved by this procedure is that the L1-processing capabilities will be used on those signals where one may expect a correct and complete decoding. The proposed technology enables an economic use of the processing resources that are available for L1 processing. The available resources can now be exclusively used to decode signals that were transmitted on channels with higher quality.

Figure 3A:
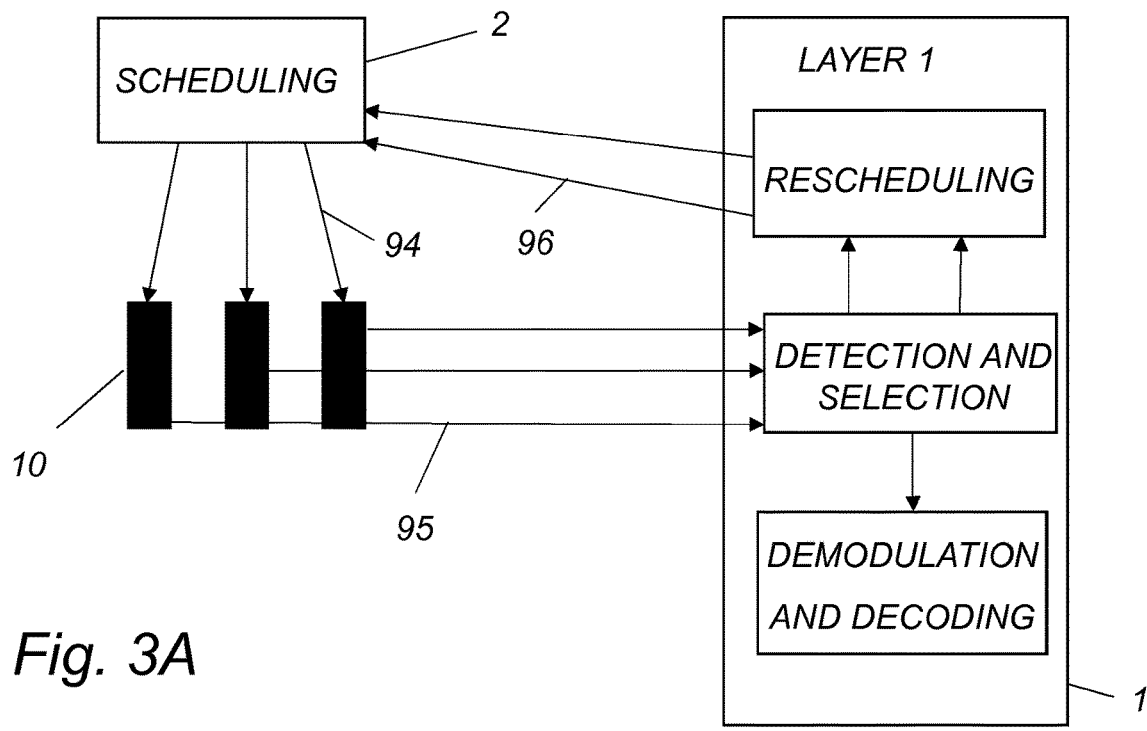
FIG. 3A is a schematic illustration of a scheduling process in a network according to a particular example of the proposed technology.

To further illustrate the proposed technology FIG. 3A provides a schematic illustration of part of a wireless communication network. The wireless communication network comprises a network node 1 and a network device 2 that is responsible for scheduling wireless communication devices. The network device 2 may in certain embodiments be incorporated in the network node 1 as a scheduler, but it can also be provided as a separate and distributed network functionality, e.g., a functionality provided by the cloud. The wireless communication network also comprises a number of wireless communication devices 10. In this simplified example there are three wireless communication devices 10, but in a real scenario the number may be vastly higher than this. In FIG. 3A it is illustrated how the network device 2 schedules the wireless communication devices for uplink transmissions, i.e., transmissions to the network node 1 by means of transferring 94 scheduling information. The strategy used for scheduling may vary between different the wireless communication devices 10. Some of the devices 10 may for example be scheduled using dynamical scheduling, e.g., based on a grant request transmitted by the device 10, while others may be scheduled to use UGF-transmissions, that is, scheduled to transmit uplink signals based on e.g., periodical resources. Having obtained the scheduling information the wireless communication devices 10 transmits 95 signals on the uplink to the network node 1. The network node 1 detects the signal and selects a subset of the detected signals for decoding. The selection may for example be based at least in part on channel estimations. In this particular example a single signal is selected for decoding while two are not selected. This can be generalized to the case where a number N of signals are selected and a number M of signals are not selected, given that N+M=total number of detected signals. The selected signal(s) will be subjected to decoding, while the network node 1 will initiate a rescheduling of the wireless communication devices that transmitted the non-selected signals. The initiation of the rescheduling may for example be to communicate 96 information that specifies the particular wireless communication devices, or enables the network device 2 to identify them, to the network device. Having obtained this information the network device 2 may reschedule the identified wireless communication devices.

Figure 4A:
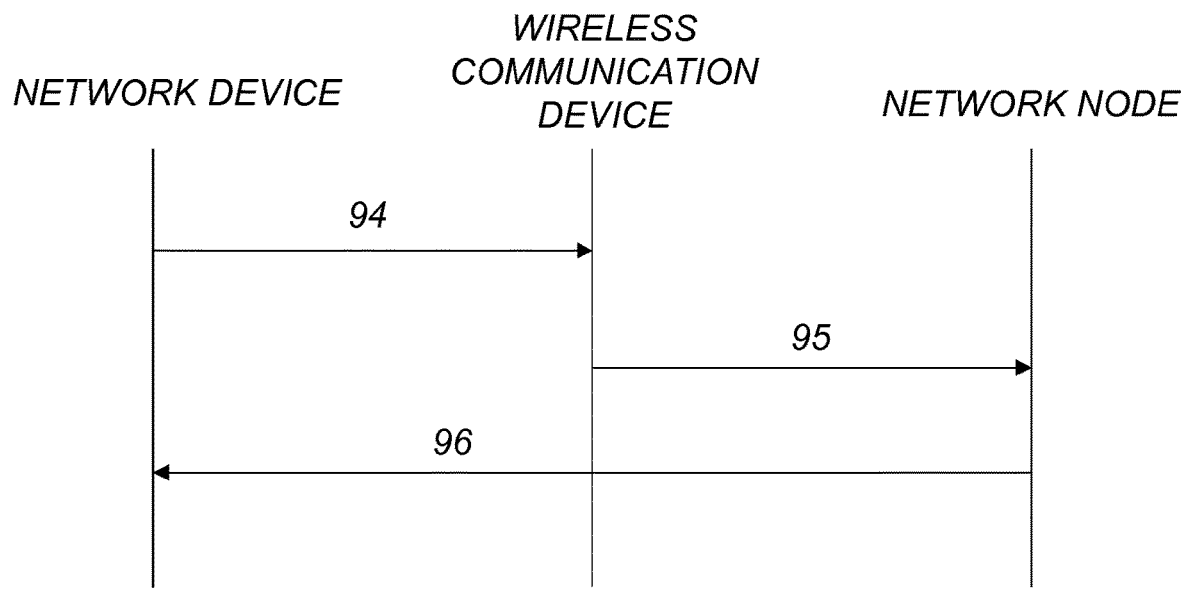
FIG. 4A is a signaling diagram illustrating the communication between devices in a wireless communication network when performing a particular embodiment of the proposed technology.

A signalling diagram illustrating the proposed technology is provided in FIG. 4A. At first the network device transfers scheduling information 94 to the wireless communication devices. Based on this information the wireless communication devices transmits signals 95 on the uplink for the network node to detect. The network node selects a subset of the signals for decoding, this may for example be based, at least in part, on a channel estimation on the corresponding channel. The network node then initiates 96 a rescheduling of the wireless communication devices that transmitted the non-selected signals.

Figure 5:
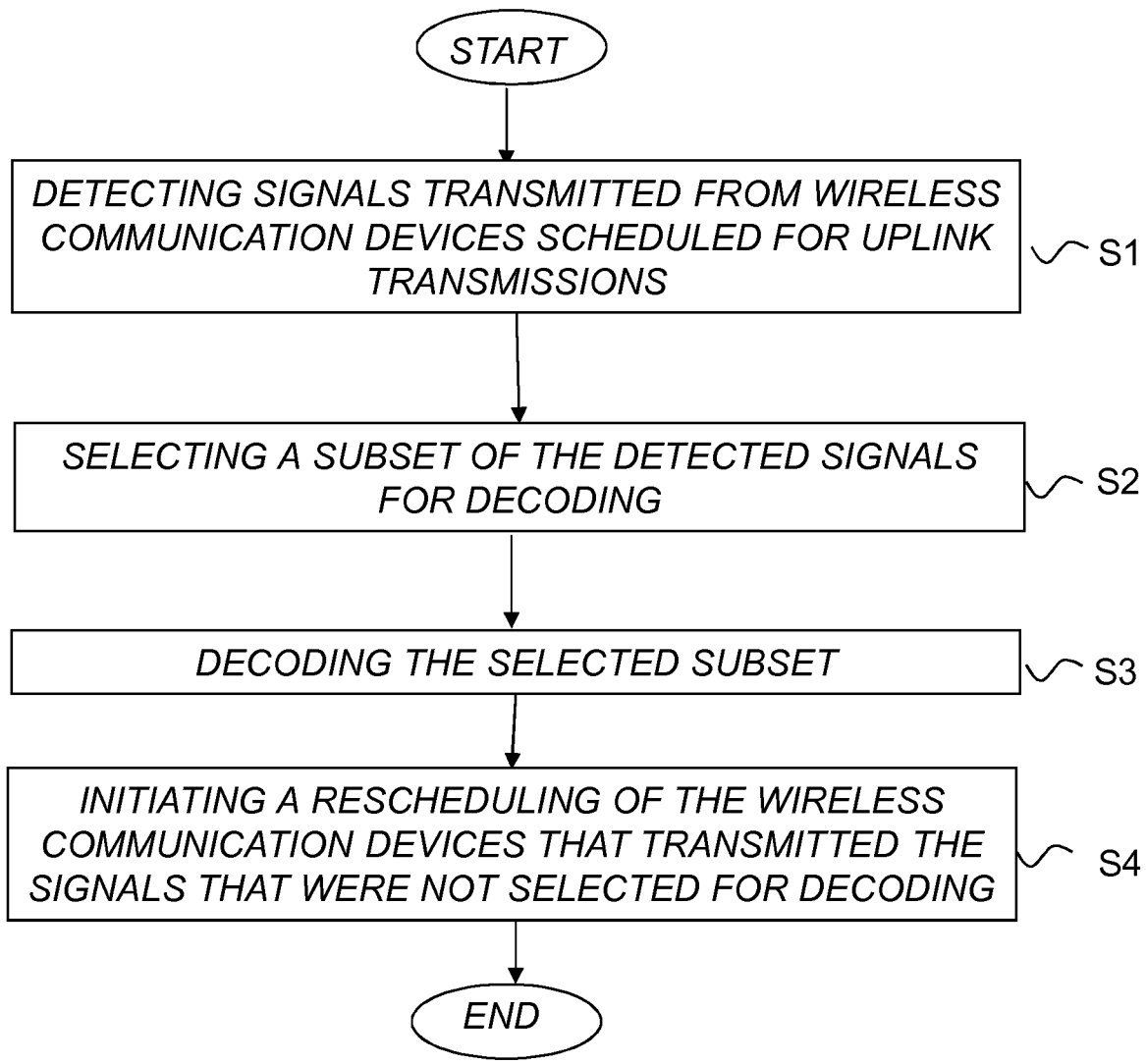
FIG. 5 is a schematic flow diagram illustrating a method according to the proposed technology.

FIG. 5 is a schematic flow diagram illustrating a method according to the proposed technology. Illustrated is a method for operating a network node 1 in a wireless communication network. The method comprises detecting S1 signals transmitted from wireless communication devices 10 scheduled for uplink transmissions. The method also comprises selecting S2 a subset of the detected signals for decoding. The method also comprises decoding S3 the selected subset, and initiating S4 a rescheduling of the wireless communication devices 10 that transmitted the detected signals that were not selected.

The proposed technology may thus be seen as a way to provide a higher priority to a wireless communication device that transmitted a signal that was detected and selected for subsequent decoding. Between the regular steps of detecting and decoding it is introduced a step where particular signals are selected for decoding and the remaining signals are used to initiate a rescheduling of the wireless communication devices responsible for transmitting the signals. The step S1 of detecting the signal may in certain embodiment also comprise the step of demodulating the signal while only the selected signals will be subject for a decoding. In certain other embodiments where the signals are not demodulated during detection the step S3 of decoding the signal may instead comprise to also demodulate the signal. The step S2 of selecting the specific signals that are to be decoded may, according to an exemplary implementation of the proposed technology be based purely on whether the signal was detected or not. That is, on binary information specifying whether the receiver registered a specific signal or not. In such a scenario at least part of detected signals will be selected for decoding while the wireless communication devices associated with the non-detected signals will be re-scheduled as initiated in step S4. This particular implementation may be suitable in a round robin scenario where equal resources are assigned to all potential users in order to obtain a fair or proportionally fair scheduling. Signals that were not detected at an expected resource will in this particular case be considered as non-selected and a re-scheduling of them will be initiated in step S4. The selection may also be based on the work load or the processing capabilities of the L1-functionality, i.e., a large number of the detected signals may be selected for decoding when the workload is low and a smaller number may be selected if the workload is high. Such a selection principle may for example prove beneficial if a lot of the transmitted signals were detected at the assigned resources. The non-selected signals, including the non-detected signals, will be subject for a rescheduling initiated in step S4. The step S2 of selecting a subset of the detected signals for decoding may also be based, at least in part, on channel estimations on the detected signals. That is, based on channel estimations of the channels corresponding to the channels over which the signals were transmitted. Such estimations may be performed and the selection may be partially based on the outcome of these estimations. It is for example possible to introduce a channel quality threshold and compare the channel estimation with the quality threshold. If a comparison between the channel estimation and the quality threshold indicates that the signal was transmitted on a channel of good enough quality the signal may be selected for decoding. On the contrary, a signal transmitted on a channel where the channel estimation indicates a poor channel quality, will not be selected S2 for decoding, instead it will provide an impetus to initiate, in step S4, a rescheduling of the wireless communication device that transmitted the corresponding signal. The selection step S2 can also be based in part on a traditional scheduling strategy in order to increase the fairness between different wireless communication devices. The step of selecting S2 a subset of the detected signals may thus be based on a selection strategy chosen to e.g., obtain maximal fairness or proportional fair. This particular embodiment may be supplemented with additional information in the form of channel estimations of the channels corresponding to the channels over which the signals were transmitted. The channel estimations may be used as input in a selection procedure where the selection aims to obtain additional advantages such as maximal fairness or proportional fair. The selection strategy may also be a combination of, for example, an initial random based selection followed by a selection based on channel estimation in order to provide additional control over the sparse processing resources. The random process picks out a subset of signals and the channel estimation process is used on this subset in order to find the most suitable signals to decode. Embodiments where a combination of different selection procedures are use may be employed in order to enable a better control of the finite processing resources available in L1 and obtain additional advantages, such as a fairness among the users. It may for example be based on channel estimations in combination with a maximal C/I scheduling strategy in order to also obtain a better spectrum efficiency. The maximal C/I scheduling is a process where a certain communication device is selected in order to swiftly maximize the system throughput. In the latter cases where additional information is used for selecting the signals it is possible to also use the estimated channel quality as an input to in order to assign a prioritization weight to the various wireless communication devices.

Some of the embodiments contemplated herein will now be described more fully. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

According to a particular embodiment of the proposed technology there is provided a method wherein at least some of the signals transmitted from the scheduled wireless communication devices 10 were transmitted using Uplink Grant Free transmission, UGF transmission, and wherein the step of selecting S2 a subset of the detected signals comprises to select signals from among the signals transmitted using the UGF transmission.

In the present disclosure the term UGF transmission are used for UL transmission without grant. There are several alternative terms used for this feature. The terms UL configured grant, or semi-persistent scheduling, are used either for the same concept or similar concept. In New Radio it is common to use the term configured grant while it is sometimes referred to as Instant uplink access in LTE. The term UGF transmission is intended to cover all these alternative terms.

According to another embodiment of the proposed technology there is provided a method wherein the step S3 of decoding the selected signals further comprises identifying, based on the outcome of the decoding, additional wireless communication devices 10 that are to be subjected to rescheduling, and wherein the step S4 of initiating a rescheduling further comprises to initiate a rescheduling of the identified additional wireless communication devices 10.

According to a particular version of the embodiment above there is provided a method wherein a wireless communication device 10 is determined to be an additional wireless communication device 10 if the outcome of a decoding of a signal transmitted by the network device comprises a buffer status report indicating that the buffer of the wireless communication device 10 contains data.

Figure 3B:
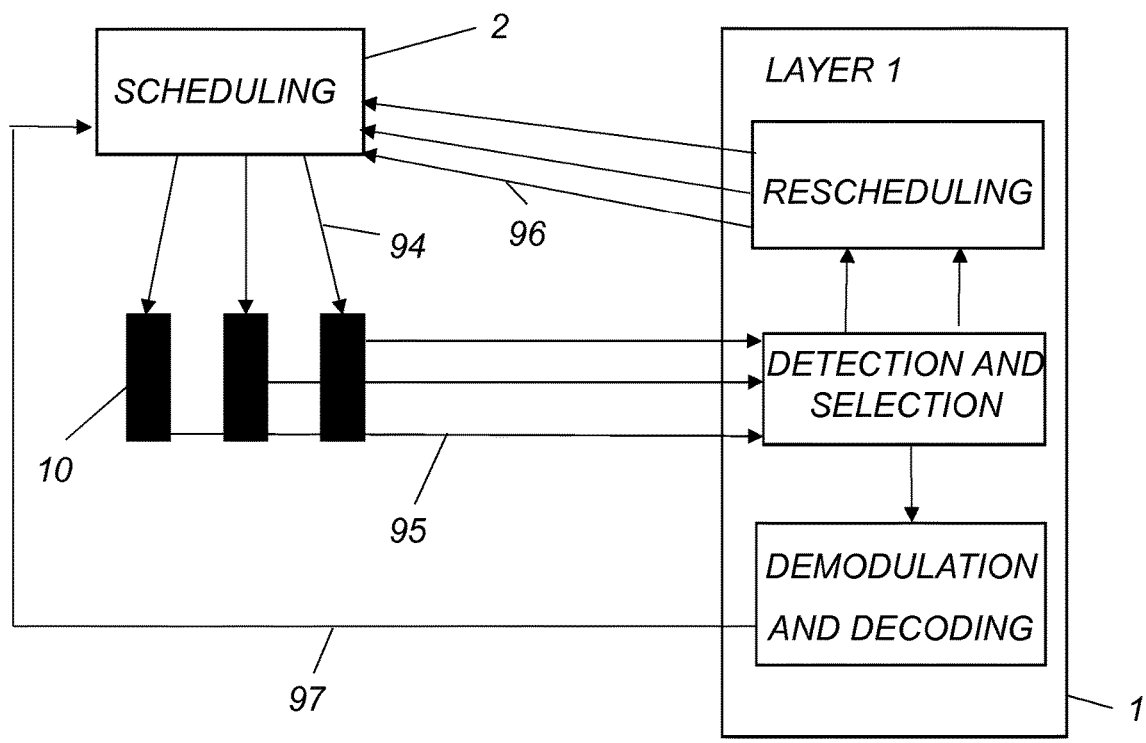
FIG. 3B is a schematic illustration of a scheduling process in a network according to another particular example of the proposed technology.

According to yet another version of the embodiment where additional wireless communication devices 10 that are to be subjected to rescheduling are identified there is provided a method, wherein a wireless communication device 10 is determined to be an additional wireless communication device 10 that needs to be rescheduled if the outcome of the decoding yielded incorrectly and/or incompletely decoded data. In order to describe this particular embodiment in greater detail reference is made to FIG. 3B. FIG. 3B provides a schematic illustration of a wireless communication network. The wireless communication network comprises a network node 1 and a network device 2 that is responsible for scheduling wireless communication devices. The network device 2 may, as was described earlier with reference to FIG. 3A, in certain embodiments be incorporated in the network node 1 as a scheduler, but it can also be provided as a separate and distributed network functionality, e.g., a functionality provided by the cloud. The wireless communication network also comprises a number of wireless communication devices 10. In this simplified example there are three wireless communication devices 10, but in a real scenario the number may be vastly higher than this. In FIG. 3B it is illustrated how the network device 2 schedules the wireless communication devices for uplink transmissions, i.e. transmissions from the wireless communication devices 10 to the network node 1, by means of transferring 94 scheduling information. The strategy used for scheduling may vary between different the wireless communication devices 10. Some of the devices 10 may for example be scheduled using dynamical scheduling, e.g., based on a grant request transmitted by the device 10, while others may be scheduled to use UGF-transmissions, that is, scheduled to transmit uplink signals based on e.g., periodical resources. Having obtained the scheduling information the wireless communication devices 10 transmits 95 signals on the uplink to the network node 1. The network node 1 detects the signals and selects a subset of the detected signals for decoding. In this particular example a single signal is selected for decoding while two are discarded.

This can be generalized to the case where a number N of signals are selected and a number M of signals are not selected, given that N+M=total number of detected signals. The selected signal(s) will be subjected to decoding, while the network node 1 will initiate a rescheduling of the wireless communication devices 10 that transmitted the non-selected signals. The initiation of the rescheduling may form example be to communicate 96 information that specifies the particular wireless communication devices, or enables the network device 2 to identify them, to the network device. Having obtained this information the network device 2 may reschedule the identified wireless communication devices. Up to now the procedure is identical with the earlier provided example of the proposed technology that was illustrated with reference to FIG. 3A. In the present embodiment the selected signal(s) are also decoded and if the content of the decoded signals indicates that the signal was incompletely and/or incorrectly decoded the wireless communication device responsible for transmitting the signals will be added to the set of wireless communication devices that will be subject to rescheduling. The information that a selected signal was incompletely and/or incorrectly decoded may be used to initiate a rescheduling of the corresponding wireless communication device. This may be done by transferring 97 information from the network node 1 to the network device 2. The transferred information should provide details that enables the network device to identify and reschedule the additional wireless communication device 10 that was responsible for transmitting the signal. The details may for example be the identity of the wireless communication device if such an identity is contained in the decoded data. The information may also be the particular resource when the corresponding signal was detected. The latter information may be used by the network device to identify the wireless communication devices based on the earlier performed scheduling of the same. That is, the network device 2 may compare the provided information with stored information relating to earlier scheduled wireless communication devices. Optionally using a signal delay parameter that indicates the delay time between the transmission of the signal and the detection of the signal.

Figure 4B:
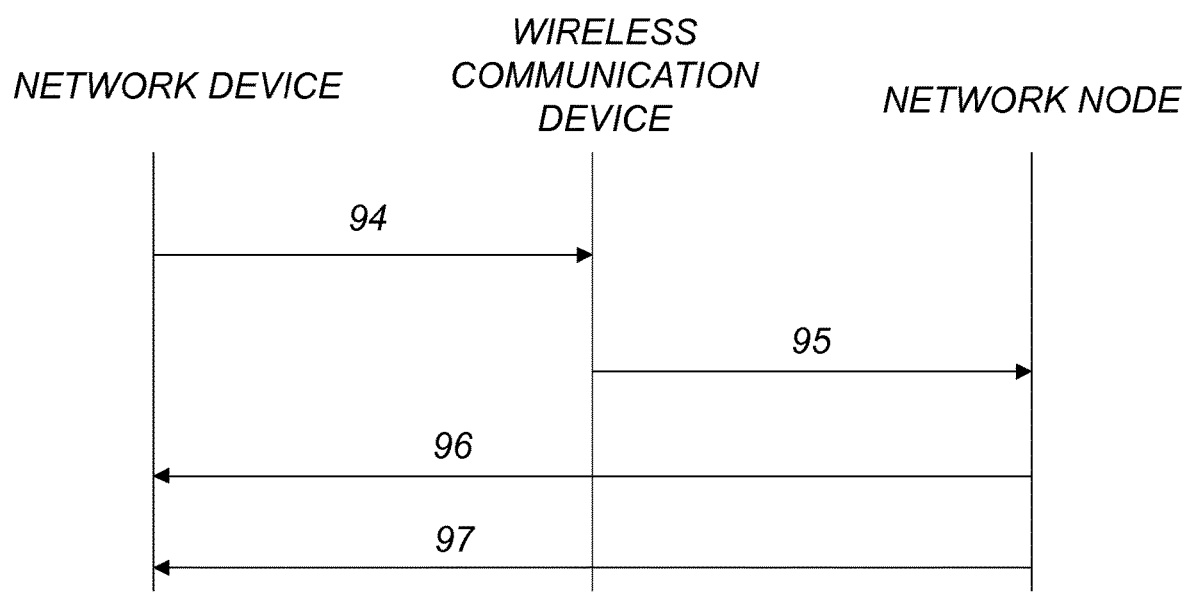
FIG. 4B is a signaling diagram illustrating the communication between devices in a wireless communication network when performing another particular embodiment of the proposed technology.

A signalling diagram illustrating the embodiment described above is provided in FIG. 4B. At first the network device transfers scheduling information 94 to the wireless communication devices. Based on this information the wireless communication devices transmits signals 95 on the uplink for the network node to detect. The network node selects a subset of the signals for decoding, this may, for example, be based at least in part on a channel estimation on the corresponding channel. The network node then initiates 96 a rescheduling of the wireless communication devices that transmitted the non-selected signals. The network node may also initiate 97 a rescheduling of any additional wireless communication devices based on the outcome of the decoding, i.e., initiate a particular wireless communication device if the outcome of the decoding implied that the data carried by the detected signal was incorrectly and/or incompletely decoded.

According to a particular version of this embodiment there is provided a method wherein a wireless communication device 10 is determined to be an additional wireless communication device 10 if the outcome of a decoding of a signal transmitted by the network device comprises a buffer status report indicating that the buffer of the wireless communication device 10 contains data.

The proposed technology also provides a method wherein the step S4 of initiating a rescheduling of wireless communication devices 10 comprises to transfer information to a network device 2, the information enabling the network device to identify and reschedule the wireless communication devices 10.

In other words, the wireless communication devices whose signals were not selected for decoding, e.g., those that were detected with inferior channel quality will not be decoded. These signals will be treated as wrongly received signals and the wireless communication devices responsible for transmitting them have to be rescheduled. The rescheduling can be initiated by communicating information to the responsible scheduling functionality, e.g. a L2 scheduler. This information may be transferred over an interface that connects L1 functionality and L2 functionalities. In certain embodiments it is possible to have the L1 functionality moved to a radio unit together with the channel estimation function. In such cases, the information may be transmitted in a message from the radio unit to the L2 scheduler in baseband unit to initiate a rescheduling.

Having described various embodiments of a method for operating a network node in order to achieve a scheduling procedure where the processing resources in the physical layer are effectively used, below we will describe a cooperating method performed by a network device to achieve the same purpose.

Figure 6:
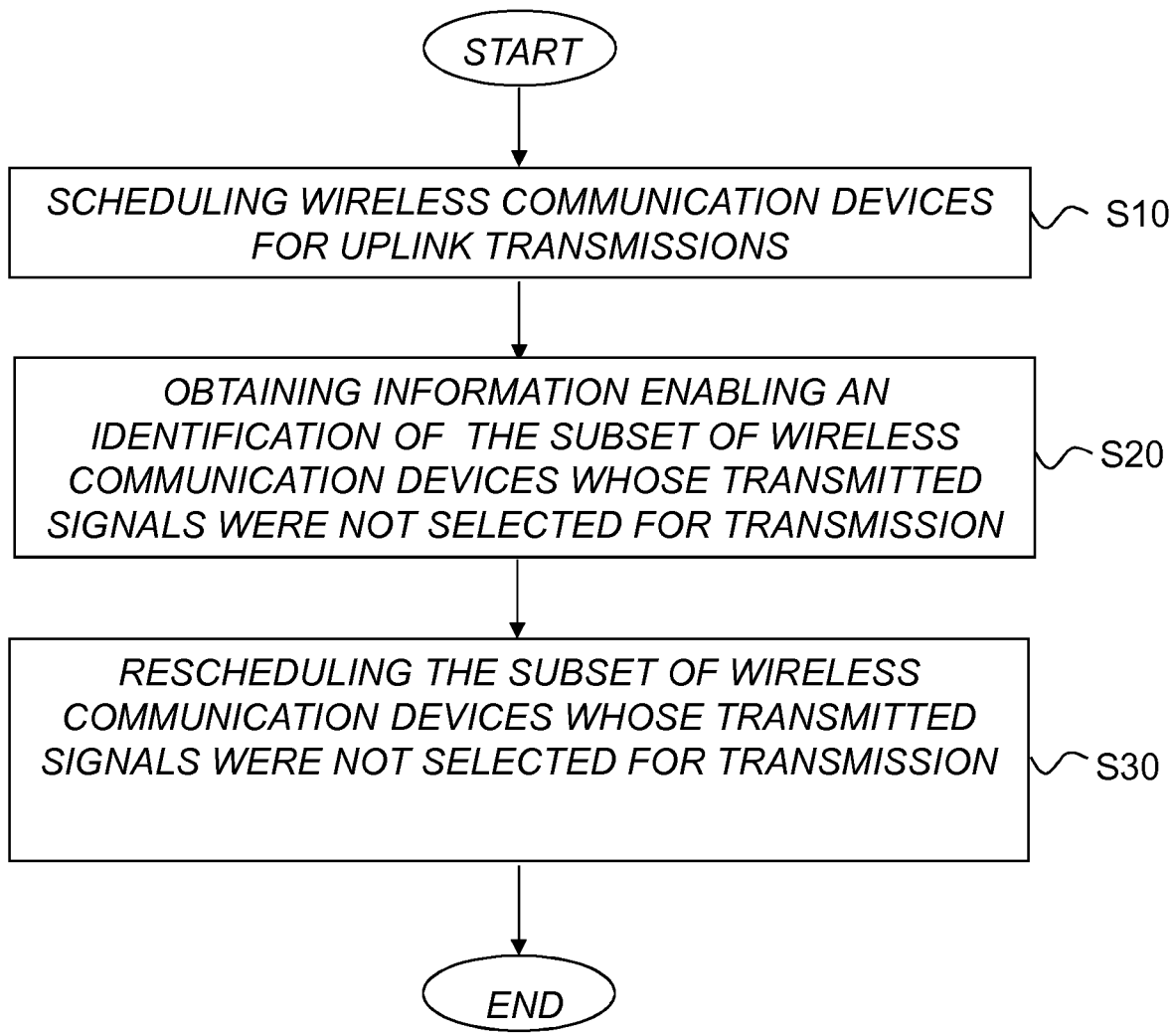
FIG. 6 is a schematic flow diagram illustrating a method according to the proposed technology. The method cooperates with the method described by the flow diagram of FIG. 5.

FIG. 6 provides an illustration of a method performed by a network device 2 in a wireless communication network. The method comprises scheduling S10 wireless communication devices 10 for uplink transmissions. The method also comprises obtaining S20 information enabling an identification of a subset of wireless communication devices 10 that transmitted signals using the scheduling but whose transmitted signals were not selected for decoding. The method also comprises rescheduling S30 the subset of wireless communication devices for uplink transmissions.

According to a particular embodiment of the proposed technology there is provided a method wherein the network device is a scheduler in the network node 1. In order to provide an overview of this particular embodiment reference is made to FIG. 2. FIG. 2 provides a schematic illustration of a network node 1 having Layer 1-functionalities that enables signal detection, channel estimation and demodulation and decoding. The network node 1 is in addition also provided with a network device 2 that is configured to schedule wireless communication devices for uplink transmissions. This particular example illustrates a network node 1 which includes the network device 2, i.e., the network device 2 is a scheduler in the network node 1. The scheduler is a Layer 2-functionality. FIG. 2 provides an illustration of the workings of the network device/scheduler 2. At first a number of wireless communication devices are scheduled, in step S10, for uplink transmissions. The scheduled wireless communication devices are instructed to transmit uplink signals according to resources assigned by the scheduler. These signals will be detected by the network node and some will be selected for decoding according to what has been described earlier. The network device/scheduler 2 will obtain, in step S20, information associated with the particular signals that was not selected for decoding. The obtained information, which can be obtained over a Layer 1-Layer 2 interface in this particular example, should enable an identification of the wireless communication devices whose signals were not selected. The information may for example comprise the identity of the wireless communication devices but it could also be information providing the particular resources where the signals was detected, e.g., the time instances and the frequencies used. This information may be used by the network device/scheduler to identify the wireless communication devices based on stored information about earlier scheduled devices. This information may be supplemented with a parameter indicating the signal delay between the transmission of the signal and the receipt of the signal. The network device/scheduler 2 will interpret the obtained information as an invite to reschedule the identified wireless communication devices, and reschedule them accordingly. FIG. 4A provides a signalling diagram illustrating the information exchange. In the example where the network device 2 is a scheduler included in the network node the exchange of information between the network device and the network node, symbolically denoted by the reference 96, should be over an interface connecting Layer 2-functionalities and Layer 1-functionalities.

The network device 2 may according to an alternative embodiment of the proposed method instead be an independent network device 2 that is able to communicate, e.g., over a core network or over a radio interface, with the network node 1 in order to exchange information. The network device 2 may for example be a cloud-based network device. Specifics of such an embodiment will be provided in a later section of the present disclosure. FIG. 3A provides a schematic illustration of part of a network comprising an independent the network device 2, a network node 1 and a number of wireless communication devices 10. In such an environment the network device 2 schedules, in step S10, the wireless communication devices for uplink transmission. The scheduling information provided to the devices is symbolically denoted with the reference 94. It should be noted that the scheduling information may be provided to wireless communication devices 10 over an intermittent radio communication device. This may be relevant if the network device 2 is a cloud-based device. The intermittent radio communication device may for example be the network node 1. Having scheduled the wireless communication devices 10, the network device 2 will obtain, in step S20, information associated with the particular signals that was not selected for decoding. The obtained information should enable an identification of the wireless communication devices whose signals were not selected. The information may for example be obtained over an interface between the network device and the network node, e.g., received over some core network interface or over the radio interface, if the network device 2 is configured to transmit and/or receive signals over the radio interface. The obtained information is interpreted by the network device as an invitation to reschedule the identified wireless communication devices 10. The rescheduling is done in step S30.

A particular embodiment of the proposed technology provides a method wherein the obtained information also comprises information enabling an identification of additional wireless communication devices 10 that transmitted signals using the scheduling but whose transmitted signals were incompletely or incorrectly decoded, and wherein the step S30 of rescheduling also comprises to reschedule the additional wireless communication devices 10.

Another particular embodiment of the proposed technology provides a method wherein the step of scheduling S10 comprises to schedule at least some of the wireless communication devices 10 to use Uplink Grant Free transmission, UGF-transmission.

Having described various embodiments of the cooperating methods according to the proposed technology, below follows particular examples of how the technology may be used in a wireless communication network.

At first the scheduling functionality, e.g., the network device or the L2-scheduler may schedule a number NUGF of RRC connected wireless communication devices 10 to use UGF-transmissions. 4.

At the reception of signals transmitted using UGF-transmission the network node 1 perform signal transmission detection for the users that are configured to transmit with UGF-transmission.

If a signal transmitted with UGF-transmission was detected at a corresponding resource, the network node will consider the user to have on-going UL transmission.

Among the number of the users that have on going transmission, the network node 1 will select a subset of the signals to subject to a complete reception process, such as demodulation, decoding, etc. The particular signals to select may, for example be based on channel estimation, but the selection mechanisms to used may also be tailored to a specific scheduling strategy such as the random selection described earlier. It may for example be based on QoS priority or proportional fair or maximal C/I.

The signals that were selected will be subject to decoding. The output of the decoding results will indicated that the signals were correctly decoded, i.e., crcOk, or indicate that the signals were incorrectly decoded, i.e., rcNotOk. In case of crcOk, the transmitted data, potentially MAC control elements such as buffer status report, might be received. In case of a buffer status report received, which shows that there is still data in the buffer of the wireless communication device, the network node will consider the wireless communication device to be a rescheduling candidate. In case of incorrectly decoded signals, rcNotOk, the network node might need to consider the corresponding wireless communication device as a retransmission scheduling candidate. The network node B might in addition to initiate a rescheduling of the wireless communication device inform the wireless communication device about the status of the detected signal. That is, the network node may inform the wireless communication device whether the data has been correctly decoded or not. This may be done using regular HARQ feedback with "ACK" or "NACK".

For the next UL transmission instance, the network device or the L2 scheduler in the network node may collect all the dynamic scheduling candidates, that is new scheduling candidates $N_{new}$, and all the rescheduling candidates $N_{ReT}$, and schedule as many as possible. The particular wireless communication devices that are to be scheduled in the next transmission instance may be determined based on specific scheduling strategies, such as QoS priority of the UEs or round robin etc. The dynamic scheduling grant, either new transmission grant or retransmission grant will be communicated to the wireless communication.

At the transmission time, the wireless communication device that receives the grant will transmit accordingly. The wireless communication devices that did not receive a grant but has been configured for UGF transmission, may also transmit in certain embodiments. Particularly if the wireless communication devices that are configured for UGF transmission has a non-empty buffer.

At the reception instance the network node B will perform reception for all wireless communication devices including dynamically scheduled devices and devices transmitting using UGF transmission. The network node will select specific signals for decoding and proceed according to what has been described.

Having now described a number of embodiments of the cooperating methods of the proposed technology, in what follows there will be described a number of corresponding devices which are configured to perform the various method steps of the proposed technology. All advantages and effects that are obtained from these devices are the same as the ones specified with regard to the proposed methods. These advantages and effects will not be specified again.

As used herein, the non-limiting terms "wireless communication device", "station", "User Equipment (UE)", and "terminal" or "terminal device" may refer to a mobile phone, a cellular phone, a Personal Digital Assistant (PDA), equipped with radio communication capabilities, a smart phone, a laptop or Personal Computer (PC), equipped with an internal or external mobile broadband modem, a tablet with radio communication capabilities, a target device, a Machine-to-Machine (M2M) device, a Machine Type Communication (MTC) device, an Internet of Thing (IoT) device, a Device-to-Device (D2D) UE, a machine type UE or UE capable of machine to machine communication, Customer Premises Equipment (CPE), Laptop Embedded Equipment (LEE), Laptop Mounted Equipment (LME), USB dongle, a portable electronic radio communication device, and/or a sensor device, meter, vehicle, household appliance, medical appliance, camera, television, radio, lightning arrangement and so forth equipped with radio communication capabilities or the like. In particular, the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

As used herein, the non-limiting term "network node" may refer to base stations, access points, network control nodes such as network controllers, radio network controllers, base station controllers, access controllers, and the like. In particular, the term "base station" may encompass different types of radio base stations including standardized base station functions such as Node Bs, or evolved Node Bs (eNBs), gNodeBs, and also macro/micro/pico radio base stations, also known as femto base stations, relay nodes, repeaters, radio access points, Base Transceiver Stations (BTSs), and even radio control nodes controlling one or more Remote Radio Units (RRUs), or the like.

The proposed technology provides a network node 1 in a wireless communication network. The network node 1 is configured to detect signals transmitted from wireless communication devices 10 scheduled for uplink transmissions. The network node 1 is also configured to select a subset of the detected signals for decoding. The network node 1 is also configured to decode the selected subset. The network node 1 is also configured to initiate a rescheduling of the wireless communication devices 10 that transmitted the detected signals that were not selected.

According to a particular embodiment of the proposed technology there is provided a network node 1, wherein at least some of the signals transmitted from the scheduled wireless communication devices 10 were transmitted using Uplink Grant Free transmission, UGF transmission, and wherein the network node 1 is configured to select signals from among the signals transmitted using the UGF transmission.

Another particular embodiment of the proposed technology provides a network node 1 that is configured to select a subset of the detected signals for decoding based, at least in part, on channel estimations on the detected signals According to another particular embodiment of the proposed technology there is provided a network node 1 that is configured to select a subset of the detected signals based on a selection strategy chosen to obtain maximal fairness or proportional fair.

According to yet another embodiment of the proposed technology there is provided a network node 1 that is configured to decode the selected signals and configured to identify, based on the outcome of the decoding, additional wireless communication devices 10 that are to be subjected to a rescheduling, and also configured to initiate a rescheduling of the identified additional wireless communication devices 10. According to still another embodiment of the proposed technology there is provided a network node 1 that is configured to determine that a wireless communication device is an additional wireless communication device 10 if the outcome of the decoding of a signal transmitted by the wireless communication device 10 comprises a buffer status report indicating that the buffer of the wireless communication device 10 contains data.

A specific embodiment of the proposed technology provides a network node 1 that is configured to determine that a network device 10 is an additional wireless communication device 10 if the outcome of the decoding of a signal transmitted by the wireless communication device 10 yielded incorrectly or incompletely decoded data.

By way of example, the proposed technology provides a network node 1 that is configured to initiate a rescheduling of wireless communication devices 10 by transferring information to a network device 2, the information enabling the network device to identify and reschedule the wireless communication devices 10.

Figure 7:
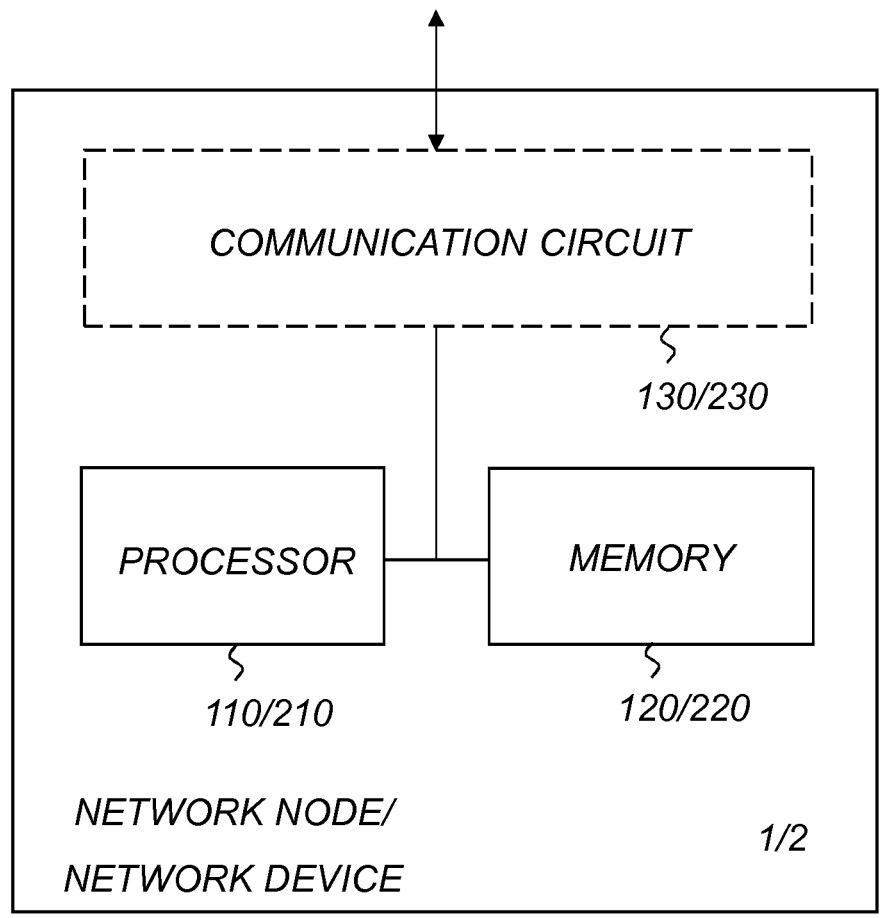
FIG. 7 is a block diagram illustrating a particular embodiment of a network node and a network device according to the proposed technology.

FIG. 7 provides a block diagram representation of an embodiment of a network node 1 according to the proposed technology. The network node comprises at least one processor 110 and memory 120, the memory comprising instructions, which when executed by the at least one processor, cause the at least one processor to operate the network node.

Figure 8:
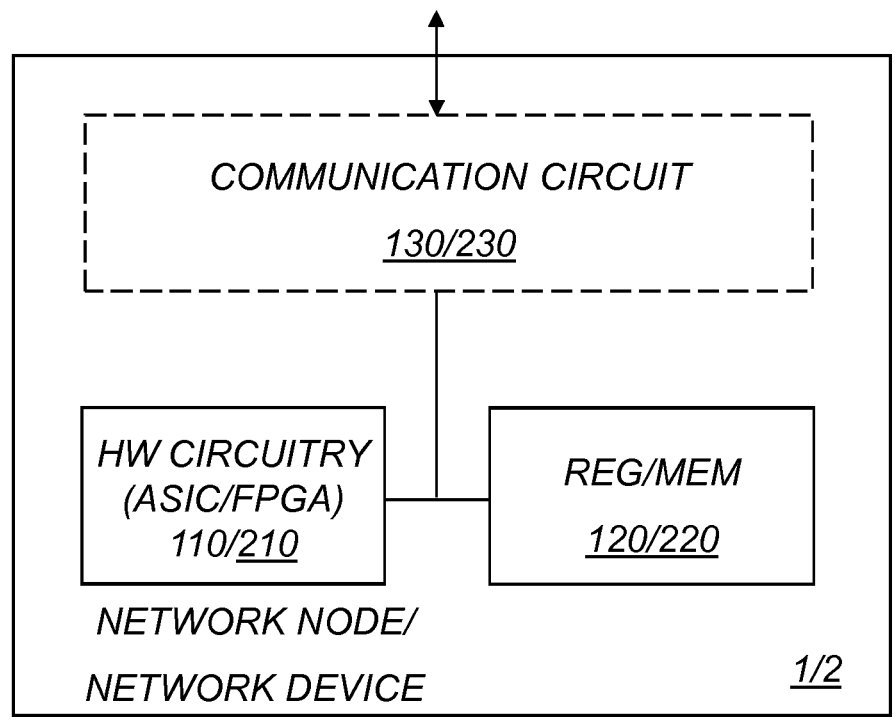
FIG. 8 is a block diagram illustrating an alternative embodiment of a network node and a network device according to the proposed technology.

FIG. 8 is a schematic block diagram illustrating another example of a network node 1, based on a hardware circuitry implementation according to an embodiment. Particular examples of suitable hardware circuitry 110 include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG) and/or memory units (MEM) 120.

The network node may also include a communication circuit 130 as depicted in FIGS. 7 and 8. The communication circuit 130 may include functions for wired and/or wireless communication with other devices and/or network nodes in the network. In a particular example, the communication circuit 130 may be based on radio circuitry for communication with one or more other nodes, including transmitting and/or receiving information. The communication circuit 130 may be interconnected to the processor 110 and/or memory 120. The communication circuit 130 may be interconnected to the hardware circuitry 110 and/or REG/MEM 120. By way of example, the communication circuit 130 may include any of the following: a receiver, a transmitter, a transceiver, input/output (I/O) circuitry, input port(s) and/or output port(s).

As used herein, the term "network device" may refer to any device located in connection with a communication network, including but not limited to devices in access networks, core networks and similar network structures. The term network device may also encompass cloud-based network devices. The network device may also be a scheduler in a network node.

The proposed technology also provides a network device 2 in a wireless communication network. The network device 2 is configured to schedule wireless communication devices 10 for uplink transmissions. The network device 2 is also configured to obtain information enabling an identification of a subset of wireless communication devices 10 that transmitted signals using the scheduling but whose transmitted signals were not selected for decoding. The network device 2 is configured to reschedule the wireless communication devices for uplink transmissions.

The network device 2 may be any suitable network device in the wireless communication system, or a network device in connection with the wireless communication system. By way of example, the network device may be a suitable network node such a base station or an access point. However, the network device may alternatively be a cloud-implemented network device.

A particular embodiment of the proposed technology provides a network device 2 wherein the obtained information also comprises information enabling an identification of additional wireless communication devices 10 that transmitted signals using the scheduling but whose transmitted signals were incompletely or incorrectly decoded, and wherein the network device 2 is also configured to reschedule the additional wireless communication devices 10.

Another embodiment of the proposed technology provides a network device 2 that is configured to schedule at least some of the wireless communication devices 10 to use Uplink Grant Free transmission, UGF-transmission.

A specific embodiment of the proposed technology provides a network device 2 wherein the network device 2 is a scheduler in a network node 1.

FIG. 7 is a block diagram representation of a network device 2 according to the proposed technology, wherein the network device comprises at least one processor 210 and memory 220, the memory comprising instructions, which when executed by the at least one processor, cause the at least one processor to operate the network device.

FIG. 8 is a schematic block diagram illustrating another example of a network device 2, based on a hardware circuitry implementation according to an embodiment. Particular examples of suitable hardware circuitry 210 include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG) and/or memory units (MEM) 220.

Optionally, the network device 2 may also include a communication circuit 230 as depicted in FIGS. 7 and 8. The communication circuit 230 may include functions for wired and/or wireless communication with other devices and/or network nodes in the network. In a particular example, the communication circuit 230 may be based on radio circuitry for communication with one or more other nodes, including transmitting and/or receiving information. The communication circuit 230 may be interconnected to the processor 210 and/or memory 220. The communication circuit 230 may be interconnected to the hardware circuitry 210 and/or REG/MEM 220. By way of example, the communication circuit may include any of the following: a receiver, a transmitter, a transceiver, input/output (I/O) circuitry, input port(s) and/or output port(s).

It will be appreciated that the methods and arrangements described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

It is also possible to provide a solution based on a combination of hardware and software. The actual hardware-software partitioning can be decided by a system designer based on a number of factors including processing speed, cost of implementation and other requirements.

Figure 9:
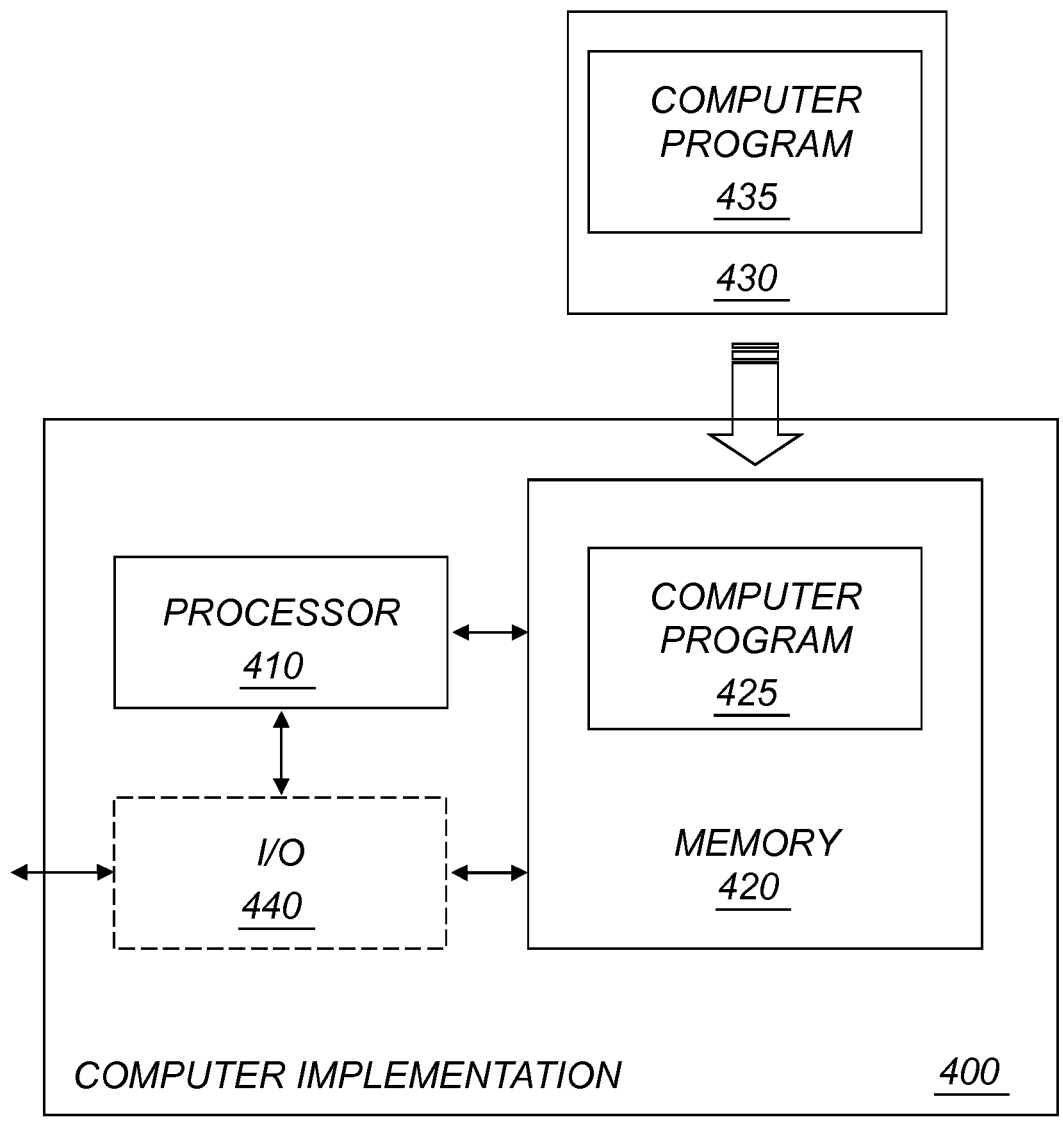
FIG. 9 is a schematic diagram illustrating a computer implementation of the proposed technology.

FIG. 9 is a schematic diagram illustrating an example of a computer-implementation 400 according to an embodiment. In this particular example, at least some of the steps, functions, procedures, modules and/or blocks described herein are implemented in a computer program 425; 435, which is loaded into the memory 420 for execution by processing circuitry including one or more processors 410. The processor(s) 410 and memory 420 are interconnected to each other to enable normal software execution. An optional input/output device 440 may also be interconnected to the processor(s) 410 and/or the memory 420 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 410 is thus configured to perform, when executing the computer program 425, well-defined processing tasks such as those described herein.

The processing circuitry does not have to be dedicated to only execute the above-described steps, functions, procedure and/or blocks, but may also execute other tasks.

According to a particular aspect of the proposed technology there is provided a computer program 425; 435 for operating, when executed, a network node 1. The computer program 425; 435 comprises instructions, which when executed by at least one processor 110, cause the at least one processor to:
- read information relating to detected signals transmitted from wireless communication devices 10 scheduled for uplink transmissions;
- select a subset of the detected signals for decoding;
- output information identifying the selected subset to enable a decoding of the selected subset; and
- output information identifying the signals that were not selected to enable an initiation of a rescheduling of the wireless communication devices 10 that transmitted the signals that were not selected.

The described computer program 425, 435 may for example comprises instructions, which when executed by at least one processor 110, cause the at least one processor to select a subset of the detected signals for decoding, wherein the selection is based, at least in part, on read channel estimations on the detected signals.

According to another aspect of the proposed technology there is provided a computer program 425; 435 for operating, when executed, a network device 2 in a wireless communication network. The computer program 425; 435 comprises instructions, which when executed by at least one processor 210, cause the at least one processor to:
- schedule wireless communication devices 10 for uplink transmissions;
- read information enabling an identification of a subset of the wireless communication devices 10 that transmitted signals using the scheduling but whose transmitted signals were not selected for decoding;
- identify the subset of wireless communication devices 10; and
- reschedule the identified subset of wireless communication devices for uplink transmissions.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 425; 435 may be realized as a computer program product, which is normally carried or stored on a computer-readable medium 420; 430, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 10:
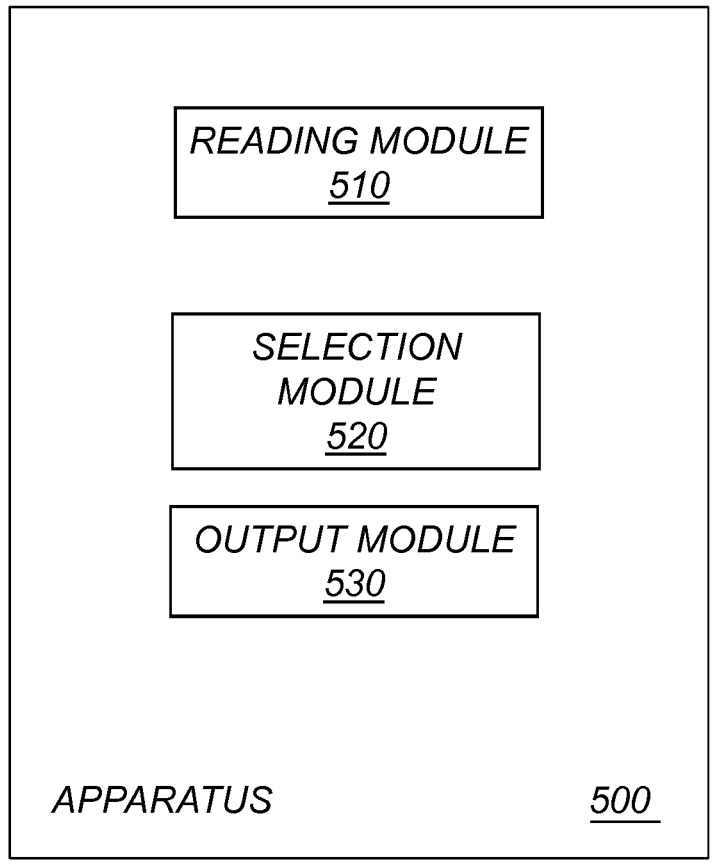
FIG. 10 is a schematic diagram illustrating an example of an apparatus according to the proposed technology.

FIG. 10 is a schematic diagram illustrating an example of an apparatus 500 according to the proposed technology. The apparatus comprises a reading module 510 for reading information relating to detected signals transmitted from wireless communication devices 10 scheduled for uplink transmissions.

The apparatus also comprises a selection module 520 for selecting a subset of the detected signals for decoding.

The apparatus also comprises an output module 530 for outputting information identifying the selected subset to enable a decoding of the selected subset and for outputting information identifying the signals that were not selected to enable an initiation of a rescheduling of the wireless communication devices 10 that transmitted the signals that were not selected.

The apparatus may in particular comprise a selection module 520 for selecting a subset of the detected signals for decoding, wherein the selection is based, at least in part, on read channel estimations on the detected signals.

Figure 11:
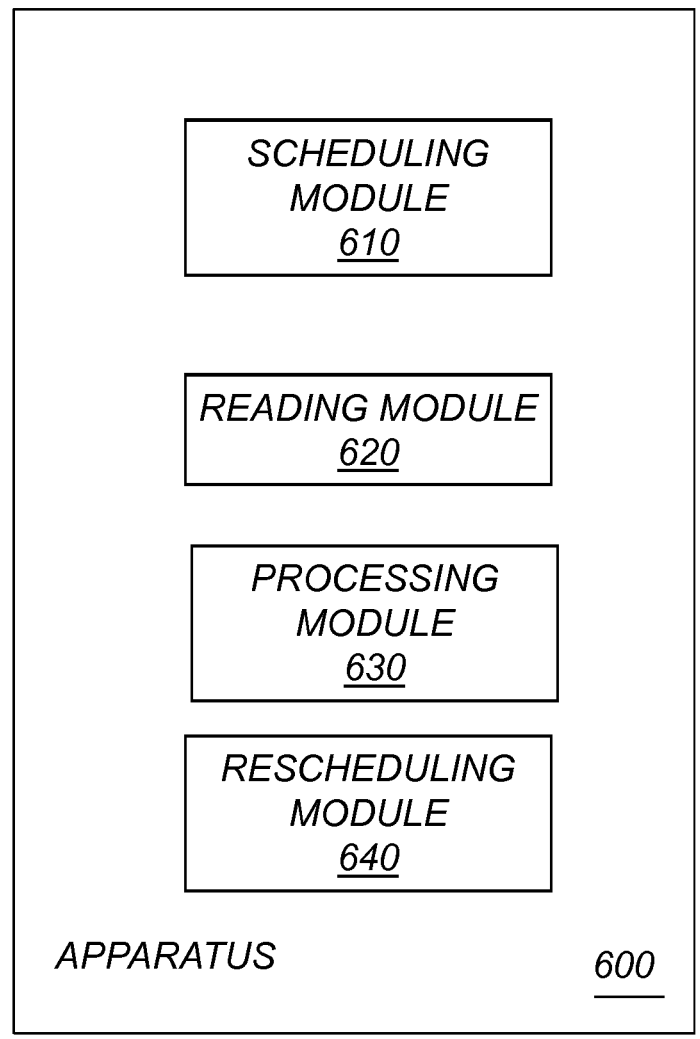
FIG. 11 is a schematic diagram illustrating an example of an apparatus according to the proposed technology

FIG. 11 is a schematic diagram illustrating an example of an apparatus 600 according to the proposed technology. The apparatus comprises a scheduling module 610 for scheduling wireless communication devices 10 for uplink transmissions.

The apparatus also comprises a reading module 620 for reading information enabling an identification of a subset of the wireless communication devices 10 that transmitted signals using the scheduling but whose transmitted signals were not selected for decoding.

The apparatus also comprises a processing module 630 for identifying the subset of wireless communication devices 10.

The apparatus also comprises a rescheduling module 640 for rescheduling the identified subset of wireless communication devices for uplink transmissions.

Alternatively it is possible to realize the module(s) in FIGS. 10 and 11 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

Figure 14:
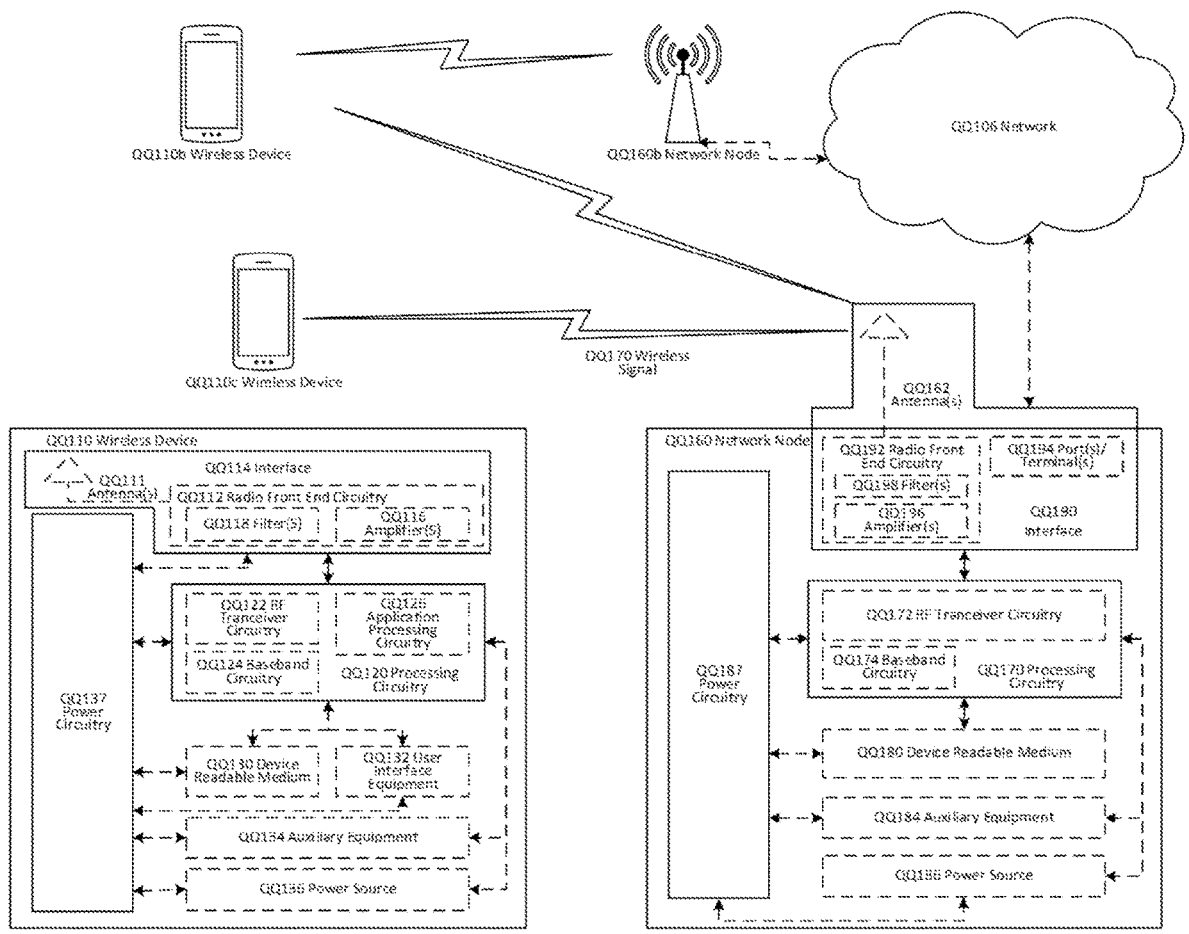
FIG. 14 is a schematic diagram illustrating an example of a wireless network in accordance with some embodiments.

By way of example, the "virtual" apparatus may be implemented in a wireless device or network node (e.g., wireless device QQ110 or network node QQ160 as shown in FIG. 14). The apparatus is operable to carry out the example method described herein, e.g. with reference to FIGS. 5 and 6 and possibly any other processes or methods disclosed herein. It is also to be understood that the methods of FIGS. 5 and 6 are not necessarily carried out solely by the apparatus in FIGS. 10 and 11, respectively. At least some operations of the method can be performed by one or more other entities.

For example, the virtual apparatus may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

The term module or unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

It is becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:
  Consolidation of network functionality into virtualized software running on customized or generic hardware. This is sometimes referred to as network function virtualization.
  Co-location of one or more application stacks, including operating system, running on separate hardware onto a single hardware platform. This is sometimes referred to as system virtualization, or platform virtualization.
  Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network.

Figure 12:
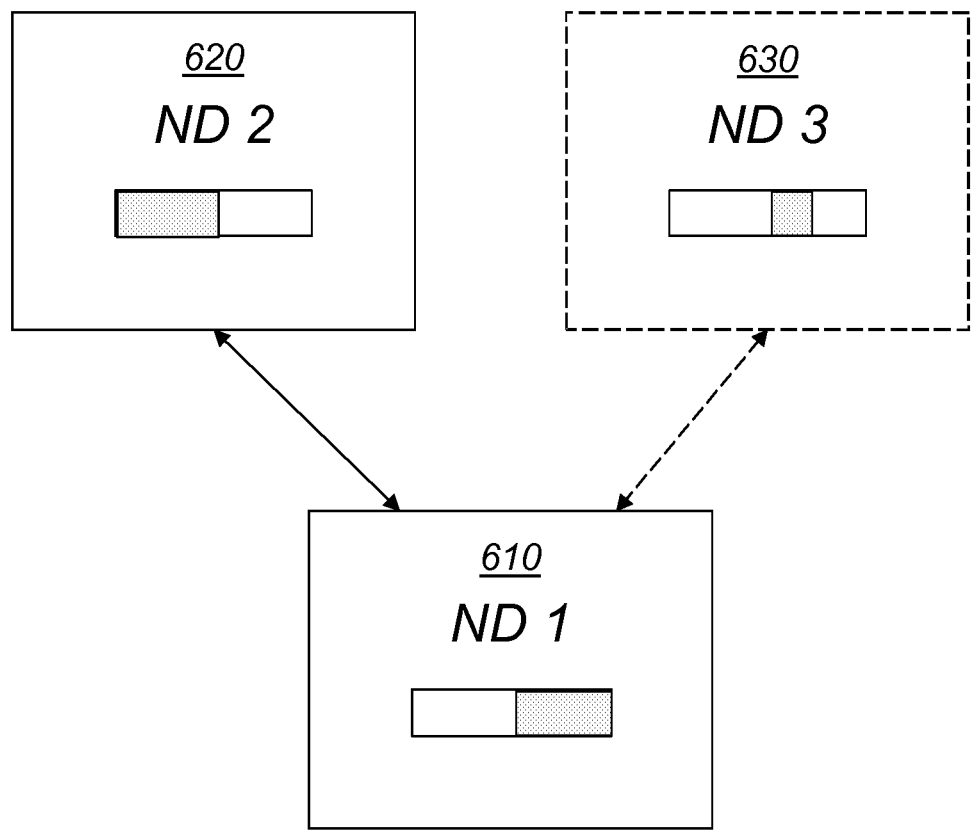
FIG. 12 is a schematic diagram illustrating an example of how functionality can be distributed or partitioned between different network devices in a general case.

FIG. 12 is a schematic diagram illustrating an example of how functionality can be distributed or partitioned between different network devices in a general case. In this example, there are at least two individual, but interconnected network devices, ND1 and ND2, with reference numerals 610 and 620, respectively, which may have different functionalities, or parts of the same functionality, partitioned between the network devices 610 and 620. There may be additional network devices, such as ND3, with reference numeral 630, being part of such a distributed implementation. The network devices 610-630 may be part of the same wireless communication system, or one or more of the network devices may be so-called cloud-based network devices located outside of the wireless communication system.

Figure 13:
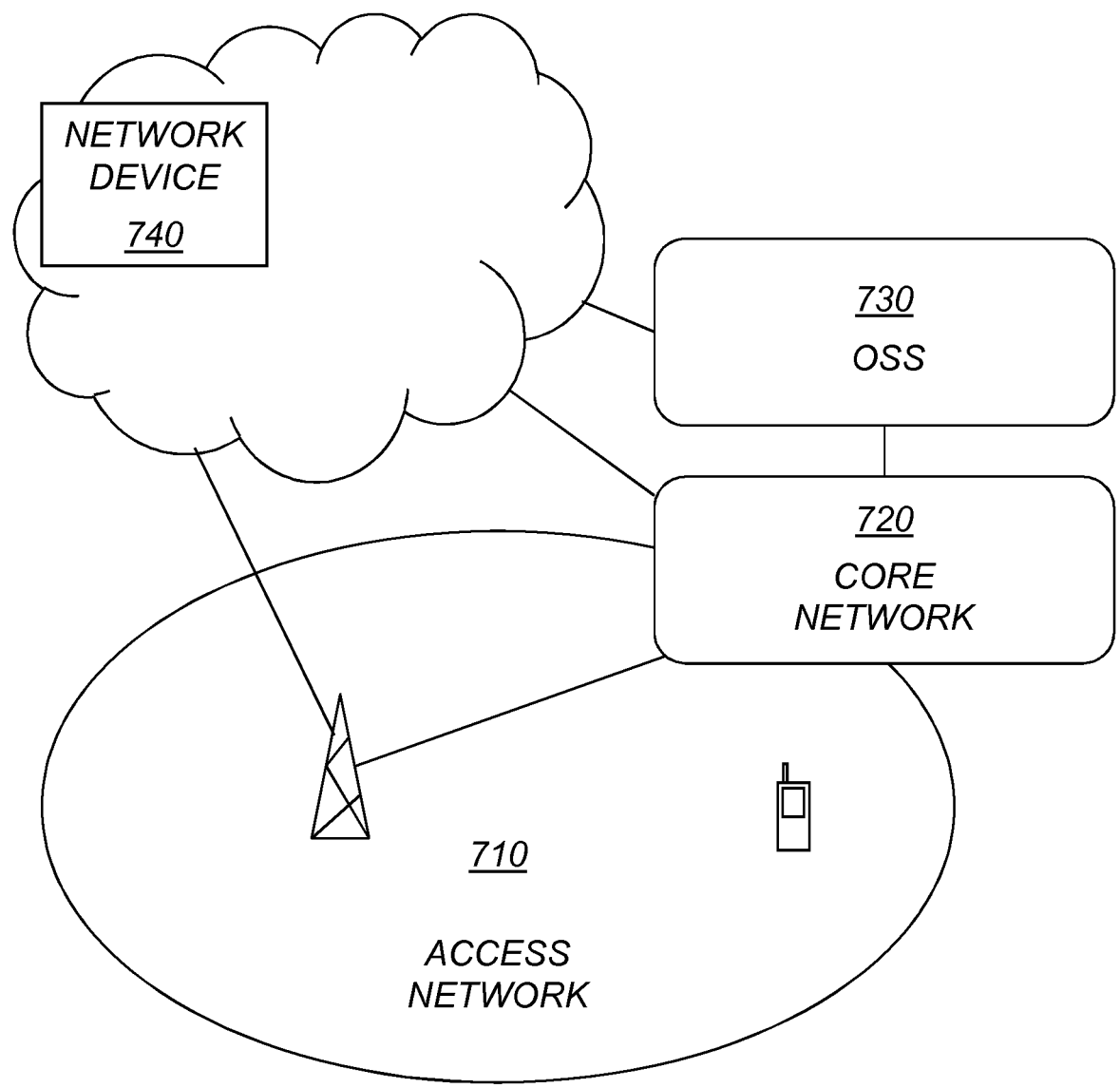
FIG. 13 is a schematic diagram illustrating an example of a cloud-based network device in connection with a wireless network according to an embodiment.

FIG. 13 is a schematic diagram illustrating an example of a wireless communication system, including an access network 710 and/or a core network 720 and/or an Operations and Support System (OSS), 730 in cooperation with one or more cloud-based network devices 740. Functionality relevant for the access network 710 and/or the core network 720 and/or the OSS system 730 may be at least partially implemented for execution in a cloud-based network device 740, with suitable transfer of information between the cloud-based network device and the relevant network nodes and/or communication units in the access network and/or the core network and/or the OSS system.

A Network Device (ND) may generally be seen as an electronic device being communicatively connected to other electronic devices in the network.

By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use common off-the-shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a wireless network interface controller (WNIC) or through plugging in a cable to a physical port connected to a network interface controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a set of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV)). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a network device ND. In certain embodiments of such a hybrid network device, a platform Virtual Machine (VM), such as a VM that implements functionality of a special-purpose network device, could provide for para-virtualization to the hardware present in the hybrid network device.

In particular, the proposed technology may be applied to specific applications and communication scenarios including providing various services within wireless networks, including so-called Over-the-Top (OTT) services. For example, the proposed technology enables and/or includes transfer and/or transmission and/or reception of relevant user data and/or control data in wireless communications.

In the following, a set of illustrative non-limiting examples will now be described with reference to FIGS. 14-20.

FIG. 14 is a schematic diagram illustrating an example of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 14. For simplicity, the wireless network of FIG. 14 only depicts network QQ106, network nodes QQ160 and QQ160b, and WDs QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 14, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 15 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of the processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 14 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal. As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of the processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 15:
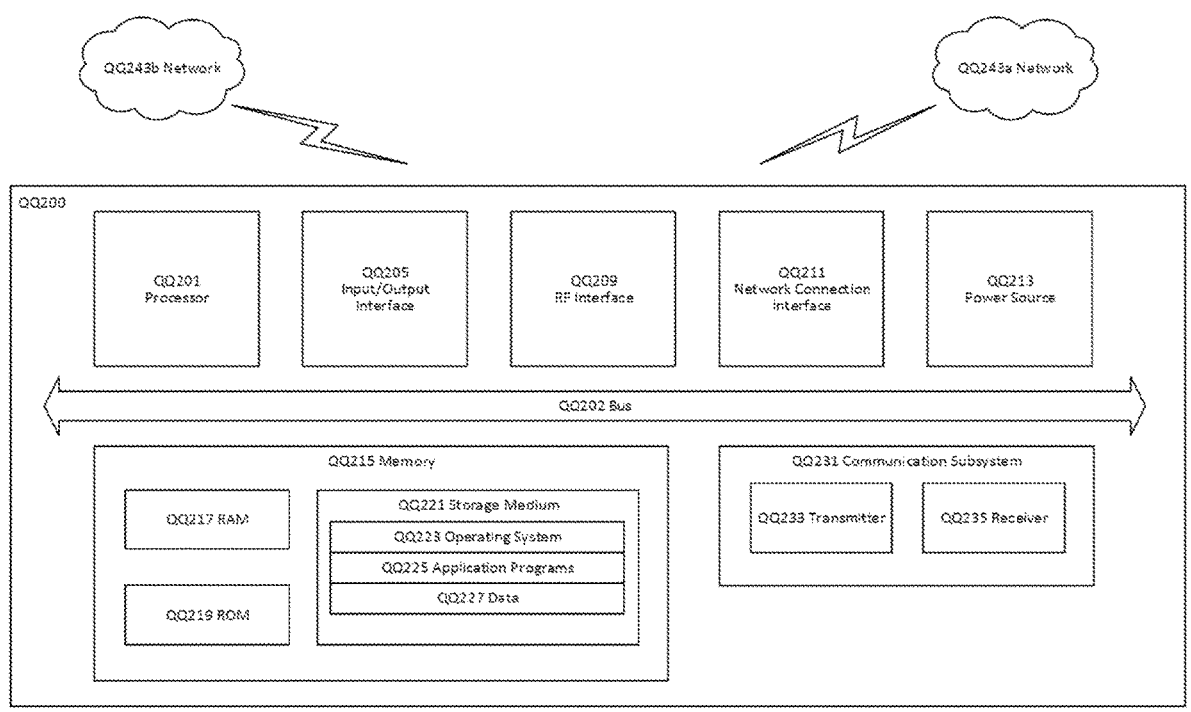
FIG. 15 is a schematic diagram illustrating an example of an embodiment of a wireless communication device, such as an User Equipment, UE, in accordance with various aspects described herein.
Figure 16:
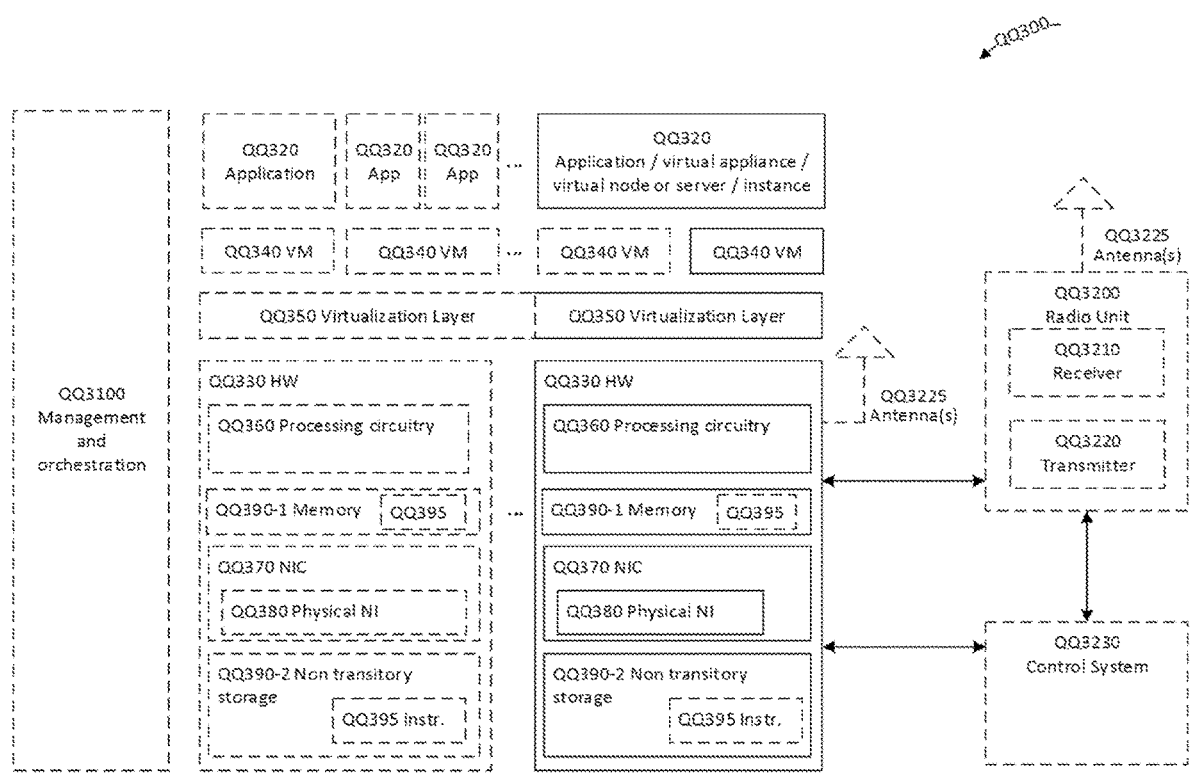
FIG. 16 is a schematic block diagram illustrating an example of a virtualization environment in which functions implemented by some embodiments may be virtualized.

FIG. 15 is a schematic diagram illustrating an example of an embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the $3^{rd}$ Generation Partnership Project (3GPP), including a NB-IoT UE, a machine type communication (MTC) UE, and/or an enhanced MTC (eMTC) UE. UE QQ200, as illustrated in FIG. 16, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 16 is a UE, the components discussed herein are equally applicable to a WD, and vice-versa.

In FIG. 15, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 15, or only a subset of the components. The level of integration between the components may vary from one UE to another UE. Further, certain UEs may contain multiple instances of a component, such as multiple processors, memories, transceivers, transmitters, receivers, etc.

In FIG. 15, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 15, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 15, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

FIG. 16 is a schematic block diagram illustrating an example of a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 16, hardware QQ330 may be a stand-alone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 16.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 17:
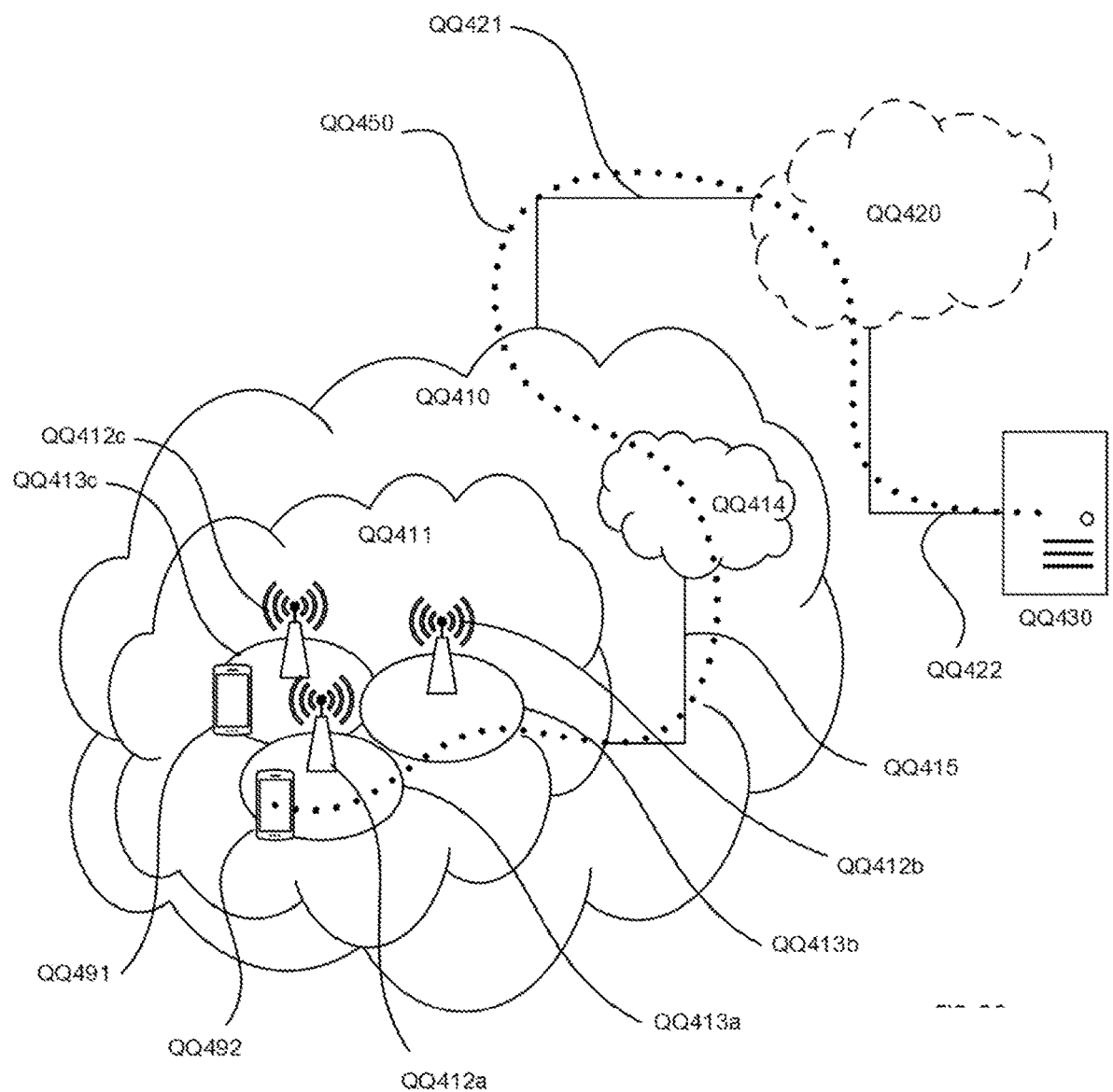
FIG. 17 is a schematic diagram illustrating an example of a telecommunication network connected via an intermediate network to a host computer in accordance with some embodiments.

FIG. 17 is a schematic diagram illustrating an example of a telecommunication network connected via an intermediate network to a host computer in accordance with some embodiments.

With reference to FIG. 17, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 17 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 18:
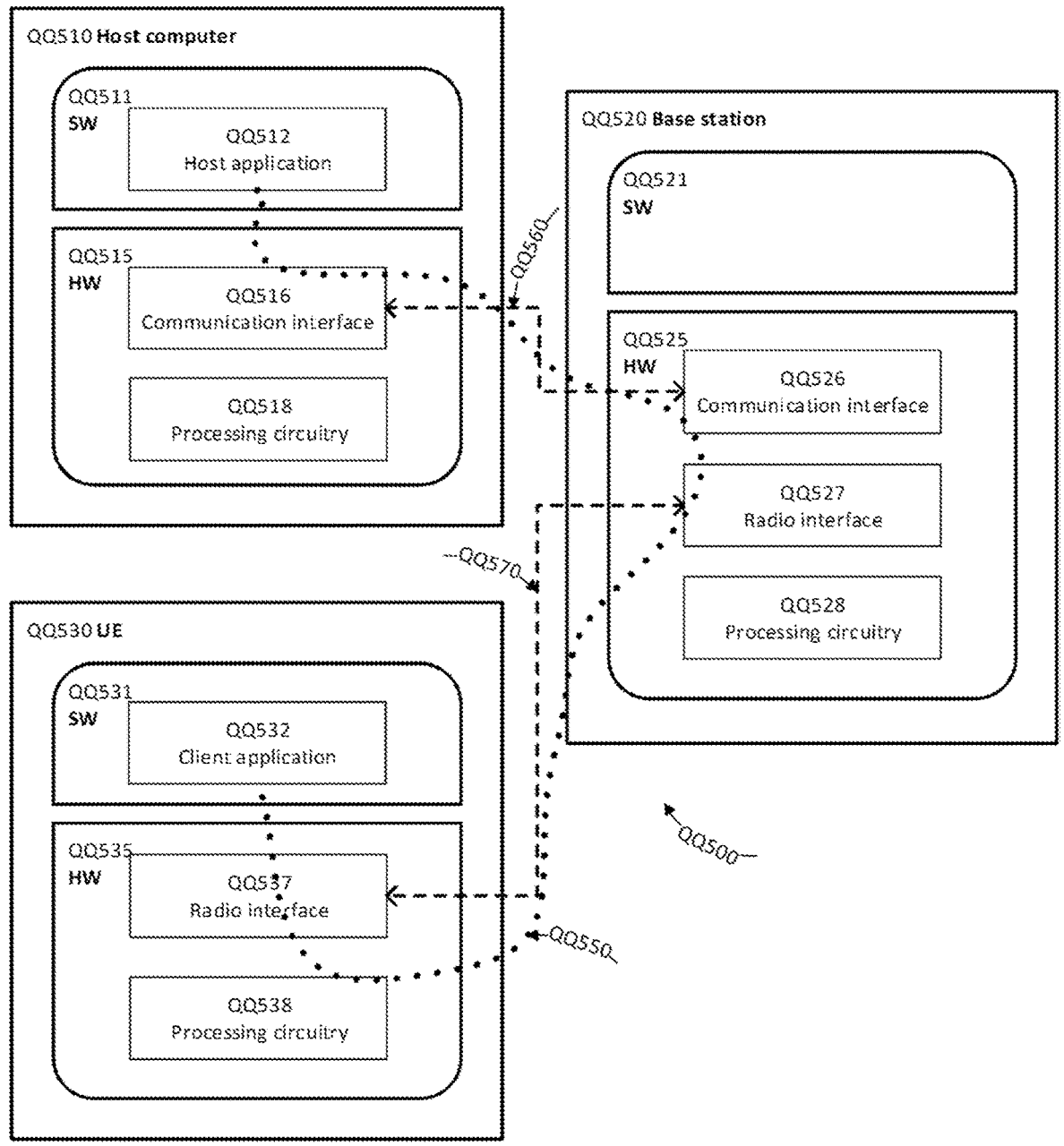
FIG. 18 is a schematic diagram illustrating an example of a host computer communicating via a base station with a user equipment over a partially wireless connection in accordance with some embodiments.

FIG. 18 is a schematic diagram illustrating an example of a host computer communicating via a base station with a user equipment over a partially wireless connection in accordance with some embodiments Example implementations, in accordance with an embodiment, of the UE, base station and host computer discussed in the preceding paragraphs will now be described with reference to FIG. 18. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 19) served by base station QQ520. Communication interface QQ526 may be configured to facilitate connection QQ560 to host computer QQ510. Connection QQ560 may be direct or it may pass through a core network (not shown in FIG. 19) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. The hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 18 may be similar or identical to host computer QQ430, one of base stations QQ412*a*, QQ412*b*, QQ412*c* and one of UEs QQ491, QQ492 of FIG. 18, respectively. This is to say, the inner workings of these entities may be as shown in FIG. 18 and independently, the surrounding network topology may be that of FIG. 17.

In FIG. 18, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 19A:
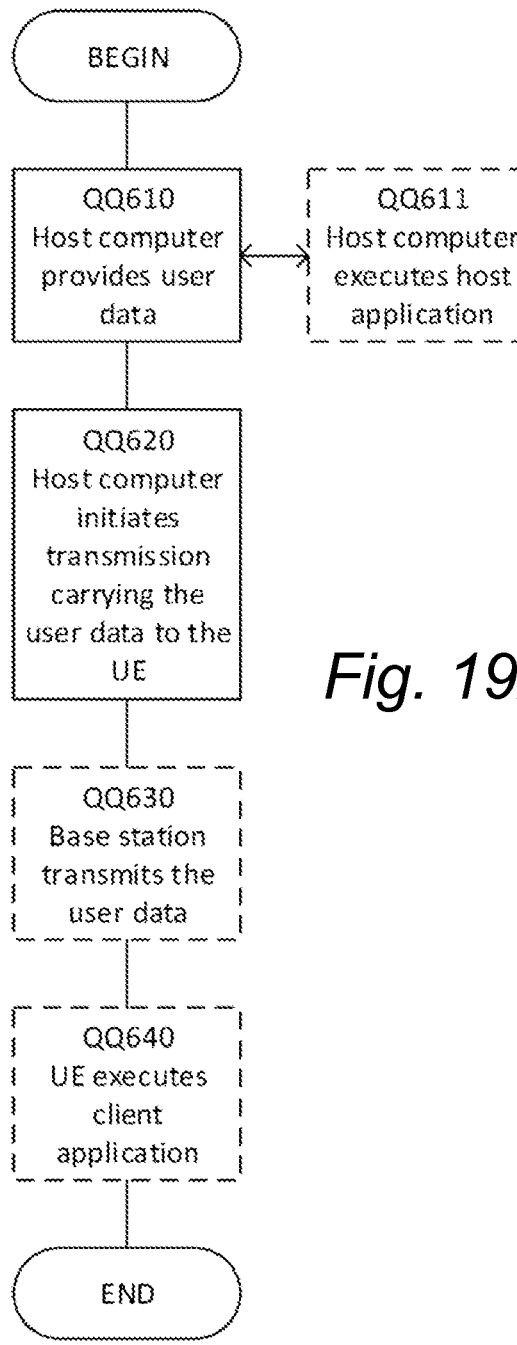
FIGS. 19 A-B are schematic flow diagrams illustrating examples of methods implemented in a communication system including, e.g. a host computer, and optionally also a base station and a user equipment in accordance with some embodiments.
Figure 19B:
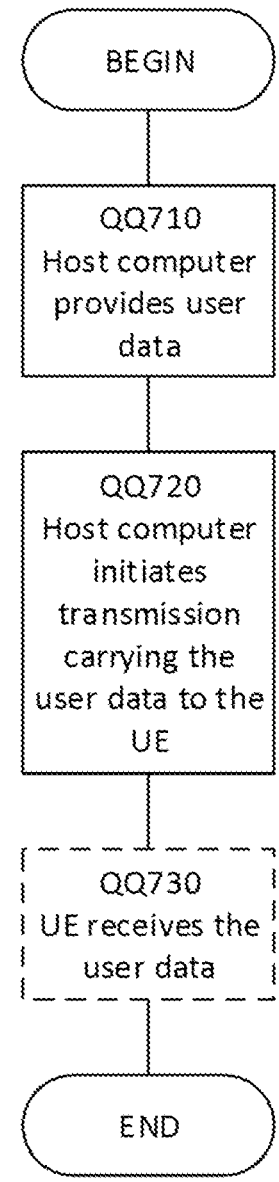

FIGS. 19A-B are schematic flow diagrams illustrating examples of methods implemented in a communication system including, e.g. a host computer, and optionally also a base station and a user equipment in accordance with some embodiments.

FIG. 19A is a flowchart illustrating a method implemented in a communication system, in accordance with one embodiment. The communication system includes a host computer, a base station and a UE which may be those described with reference to FIG. 17 and FIG. 18. For simplicity of the present disclosure, only drawing references to FIG. 19A will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

FIG. 19B is a flowchart illustrating a method implemented in a communication system, in accordance with one embodiment. The communication system includes a host computer, a base station and a UE which may be those described with reference to FIG. 17 and FIG. 18. For simplicity of the present disclosure, only drawing references to FIG. 19B will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figures 20A, 20B:
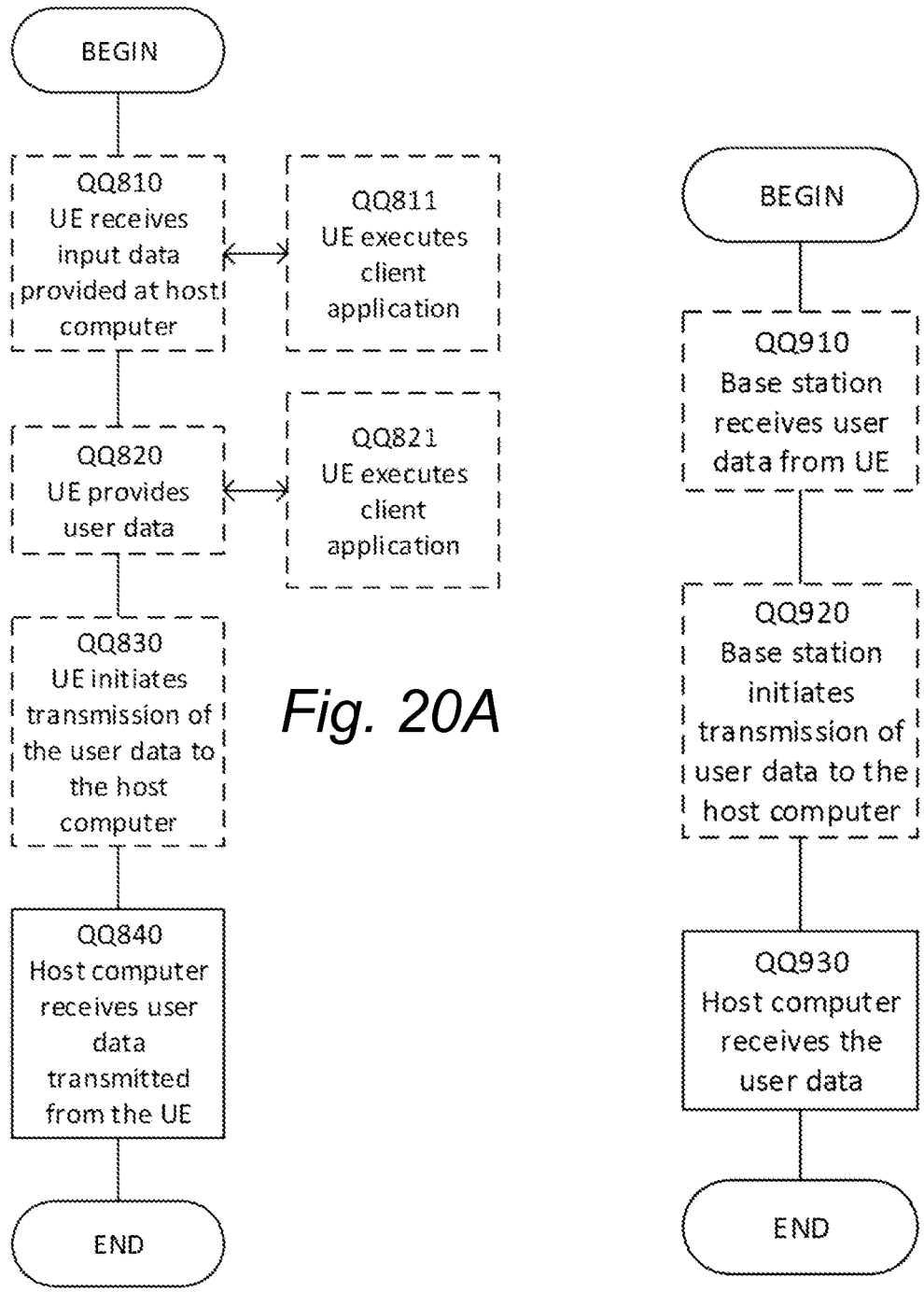
FIGS. 20 A-B are schematic diagrams illustrating examples of methods implemented in a communication system including a host computer, a base station and a user equipment in accordance with some embodiments.

FIGS. 20A-B are schematic diagrams illustrating examples of methods implemented in a communication system including a host computer, a base station and a user equipment in accordance with some embodiments.

FIG. 20A is a flowchart illustrating a method implemented in a communication system, in accordance with one embodiment. The communication system includes a host computer, a base station and a UE which may be those described with reference to FIG. 17 and FIG. 18. For simplicity of the present disclosure, only drawing references to FIG. 20A will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

FIG. 20B is a flowchart illustrating a method implemented in a communication system, in accordance with one embodiment. The communication system includes a host computer, a base station and a UE which may be those described with reference to FIG. 17 and FIG. 18. For simplicity of the present disclosure, only drawing references to FIG. 20B will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

In the following, examples of illustrative and non-limiting numbered embodiments will be given:

1. A base station 1 configured to communicate with a user equipment (UE) 10, the base station comprising a radio interface and processing circuitry configured to: detect signals transmitted from UEs 10 scheduled for uplink transmissions; select a subset of the detected signals for decoding;

decode the selected subset; and initiate a rescheduling of the UEs 10 that transmitted the detected signals that were not selected.

2. The base station according to embodiment 1, wherein at least some of the signals transmitted from the scheduled UEs 10 were transmitted using Uplink Grant Free transmission, UGF transmission, and wherein the base station is configured to select signals from among the signals transmitted using the UGF transmission.

3. The base station according to any of the embodiments 1-2, wherein the base station is configured to select a subset of the signals based, at least in part, on channel estimations on the detected signals 4. The base station according to any of the embodiments 1-3, wherein the base station 1 is configured to select a subset of the detected signals based on a selection strategy chosen to obtain maximal fairness or proportional fair.

5. The base station 1 according to any of the embodiments 1-4, wherein the base station is configured to decode the selected signals and configured to identify, based on the outcome of the decoding, additional UEs 10 that are to be subjected to a rescheduling, and also configured to initiate a rescheduling of the identified additional UEs.

6. The base station 1 according to embodiment 5, wherein the base station (1) is configured to determine that a UE 10 is an additional UE 10 if the outcome of the decoding of a signal transmitted by the UE 10 comprises a buffer status report indicating that the buffer of the UE 10 contains data.

7. The base station 1 according to embodiment 5, wherein the base station 1 is configured to determine that a UE 10 is an additional UE 10 if the outcome of the decoding of a signal transmitted by the UE 10 yielded incorrectly or incompletely decoded data.

8. A communication system including a host computer comprising: processing circuitry configured to provide user data; and a communication interface configured to forward the user data to a cellular network for transmission to a user equipment UE, wherein the cellular network comprises a base station having a radio interface and processing circuitry, the base station's processing circuitry configured to:

detect signals transmitted from UEs 10 scheduled for uplink transmissions; select a subset of the detected signals for decoding, wherein the selection is based, at least in part, on channel estimations on the detected signals;

decode the selected subset; and initiate a rescheduling of the UEs 10 that transmitted the detected signals that were not selected 9. The communication system of embodiment 8, wherein the base station's processing circuitry is configured to select a subset of the detected signals for decoding, wherein the selection is based, at least in part, on channel estimations on the detected signals.

10. The communication system of any of the embodiments 8-9, further including the base station.

11. The communication system of embodiment 10, further including the UE, wherein the UE is configured to communicate with the base station.

12. The communication system of embodiment 11, wherein:

the processing circuitry of the host computer is configured to execute a host application, thereby providing the user data; and the UE comprises processing circuitry configured to execute a client application associated with the host application.

13. A method implemented in a base station, comprising:
detecting S1 signals transmitted from UEs 10 scheduled for uplink transmissions;
selecting S2 a subset of the detected signals for decoding,
decoding S3 the selected subset; and
initiating S4 a rescheduling of the UEs 10 that transmitted the detected signals that were not selected.

14. The method of embodiment 13, wherein the step of selecting S2 a subset of the detected signals for decoding is based, at least in part, on channel estimations on the detected signals.

15. The method according to any of the embodiments 13-14, wherein at least some of the signals transmitted from the scheduled UEs 10 were transmitted using Uplink Grant Free transmission, UGF transmissions, and wherein the step of selecting S2 a subset of the detected signals comprises to select signals from among the signals transmitted using the UGF transmission.

16. The method according to any of the embodiments 13-15, wherein the step of selecting S2 a subset of the detected signals is further based on a selection strategy chosen to obtain maximal fairness or proportional fair.

17. The method according to any of the embodiments 13-16, wherein the step S3 of decoding the selected signals further comprises identifying, based on the outcome of the decoding, additional UEs 10 that are to be subjected to rescheduling, and wherein the step S4 of initiating a rescheduling further comprises to initiate a rescheduling of the identified additional UEs 10.

18. The method according to embodiment 17, wherein a UE 10 is determined to be an additional UE if the outcome of a decoding of a signal transmitted by the network device comprises a buffer status report indicating that the buffer of the UE 10 contains data.

19. The method according to embodiment 14, wherein a UE 10 is determined to be an additional UE 10 that needs to be rescheduled if the outcome of the decoding yielded incorrectly or incompletely decoded data.

20. The method according to any of the embodiments 14-19, wherein the step S4 of initiating a rescheduling of UEs 10 comprises to transfer information to a network device 2, the information enabling the network device to identify and reschedule the UEs 10.

21. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station is configured for:
detecting S1 signals transmitted from UEs 10 scheduled for uplink transmissions;
selecting S2 a subset of the detected signals for decoding;
decoding S3 the selected subset; and
initiating S4 a rescheduling of the UEs 10 that transmitted the detected signals that were not selected.

22. The method of embodiment 21, wherein the base station is configured for selecting S2 a subset of the detected signals for decoding based, at least in part, on channel estimations on the detected signals.

23. The method of any of the embodiments 21-22, further comprising:
at the base station, transmitting the user data.

24. The method of embodiment 23, wherein the user data is provided at the host computer by executing a host application, the method further comprising:
at the UE, executing a client application associated with the host application.

The embodiments described above are merely given as examples, and it should be understood that the proposed technology is not limited thereto. It will be understood by those skilled in the art that various modifications, combinations and changes may be made to the embodiments without departing from the present scope as defined by the appended embodiments. In particular, different part solutions in the different embodiments can be combined in other configurations, where technically possible.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method for operating a network node in a wireless communication network, the method comprising:
   detecting signals transmitted from wireless communication devices scheduled for uplink transmissions;
   selecting a subset of the detected signals for decoding;
   decoding said selected subset; and
   initiating a rescheduling of the wireless communication devices that transmitted the detected signals that were not selected for decoding.

2. The method according to claim 1, wherein at least some of the signals transmitted from said scheduled wireless communication devices were transmitted using Uplink Grant Free (UGF) transmission and wherein the selecting the subset of the detected signals comprises selecting signals from among the signals transmitted using said UGF transmission.

3. The method according to claim 1, wherein the selecting the subset of the detected signals for decoding is based, at least in part, on channel estimations on the detected signals.

4. The method according to claim 1, wherein the selecting the subset of the detected signals is based on a selection strategy chosen to obtain maximal fairness or proportional fair.

5. The method according to claim 1, wherein the decoding said selected signals further comprises identifying, based on an outcome of said decoding, additional wireless communication devices that are to be subjected to rescheduling, and wherein the initiating the rescheduling further comprises initiating a rescheduling of said identified additional wireless communication devices.

6. The method according to claim 5, wherein a wireless communication device is determined to be an additional wireless communication device when the outcome of a decoding of a signal transmitted by said wireless communication device comprises a buffer status report indicating that a buffer of the wireless communication device contains data.

7. The method according to claim 5, wherein a wireless communication device is determined to be an additional wireless communication device that needs to be rescheduled when the outcome of said decoding yielded incorrectly or incompletely decoded data.

8. The method according to claim 1, wherein the initiating the rescheduling of wireless communication devices comprises transferring information to a network device, said information enabling said network device to identify and reschedule said wireless communication devices.

9. A network node in a wireless communication network comprising:
   at least one processor; and
   a memory comprising instructions which, when executed by the at least one processor, cause the network node to:
   detect signals transmitted from wireless communication devices scheduled for uplink transmissions;
   select a subset of the detected signals for decoding;
   decode said selected subset; and
   initiate a rescheduling of the wireless devices that transmitted the detected signals that were not selected for decoding.

10. The network node according to claim 9, wherein at least some of the signals transmitted from said scheduled wireless communication devices were transmitted using Uplink Grant Free (UGF) transmission and wherein the network node is configured to select signals from among the signals transmitted using said UGF transmission.

11. The network node according to claim 9, wherein the network node is configured to select a subset of the detected signals for decoding based, at least in part, on channel estimations on the detected signals.

12. The network node according to claim 9, wherein the network node is configured to select a subset of the detected signals based on a selection strategy chosen to obtain maximal fairness or proportional fair.

13. The network node according to claim 9, wherein the network node is configured to decode said selected signals and configured to identify, based on an outcome of said decoding, additional wireless communication devices that are to be subjected to a rescheduling, and also configured to initiate a rescheduling of said identified additional wireless communication devices.

14. The network node according to claim 13, wherein the network node is configured to determine that a wireless communication device is an additional wireless communication device when the outcome of the decoding of a signal transmitted by said wireless communication device comprises a buffer status report indicating that a buffer of the wireless communication device contains data.

15. The network node according to claim 13, wherein the network node is configured to determine that a wireless communication device is an additional wireless communication device when the outcome of the decoding of a signal transmitted by said wireless communication device yielded incorrectly or incompletely decoded data.

16. The network node according to claim 9, wherein the wireless communication device is configured to initiate a rescheduling of wireless communication devices by transferring information to a network device, said information enabling said network device to identify and reschedule said wireless communication devices.

17. A method performed by a network device in a wireless communication network, the method comprising:
  scheduling wireless communication devices for uplink transmissions;
  obtaining information enabling an identification of a subset of detected signals transmitted from wireless communication devices using said scheduling , in which the subset of the detected signals were selected for decoding; and
  rescheduling wireless communication devices for uplink transmissions whose transmitted signals were not selected for decoding.

18. The method according to claim 17, wherein the obtained information also comprises information enabling an identification of additional wireless communication devices that transmitted signals using said scheduling but whose transmitted signals were incompletely or incorrectly decoded, and wherein the rescheduling also comprises rescheduling said additional wireless communication devices.

19. The method according to claim 17, wherein the scheduling comprises scheduling at least some of said wireless communication devices to use Uplink Grant Free transmission (UGF).

20. A network device in a wireless communication network, comprising:
  at least one processor; and
  a memory comprising instructions which, when executed by the at least one processor, cause the network device to:
    schedule wireless communication devices for uplink transmissions;
    obtain information enabling an identification of a subset of detected signals transmitted from wireless communication devices using said scheduling , in which the subset of the detected signals were selected for decoding; and
    reschedule wireless communication devices for uplink transmissions whose transmitted signals were not selected for decoding.

* * * * *